US009061736B2

(12) United States Patent
Smith

(10) Patent No.: US 9,061,736 B2
(45) Date of Patent: Jun. 23, 2015

(54) HULL ROBOT FOR AUTONOMOUSLY DETECTING CLEANLINESS OF A HULL

(71) Applicant: Raytheon Company, Waltham, MA (US)

(72) Inventor: Fraser M. Smith, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 30 days.

(21) Appl. No.: 13/769,337

(22) Filed: Feb. 17, 2013

(65) Prior Publication Data

US 2014/0076224 A1 Mar. 20, 2014

Related U.S. Application Data

(60) Provisional application No. 61/701,512, filed on Sep. 14, 2012, provisional application No. 61/701,517, filed on Sep. 14, 2012, provisional application No. 61/701,523, filed on Sep. 14, 2012, provisional application No. 61/701,529, filed on Sep. 14, 2012, provisional application No. 61/701,534, filed on Sep. 14, 2012, provisional application No. 61/701,537, filed on Sep. 14, 2012.

(51) Int. Cl.
*B63B 17/00* (2006.01)
*B63B 59/06* (2006.01)
*B63B 59/10* (2006.01)
*B63B 9/00* (2006.01)
(Continued)

(52) U.S. Cl.
CPC ............... *B63B 17/00* (2013.01); *Y10S 901/01* (2013.01); *Y10S 901/41* (2013.01); *B63B 59/10* (2013.01); *B63B 59/06* (2013.01); *Y10S 901/44* (2013.01); *B63B 9/00* (2013.01); *B63B 59/08* (2013.01); *B62D 55/265* (2013.01); *B62D 55/32* (2013.01); *B63G 8/001* (2013.01); *G05D 1/00* (2013.01); *G05D 1/021* (2013.01); *G05D 2201/0203* (2013.01)

(58) Field of Classification Search
CPC ........ B63C 11/00; B63C 11/42; B63B 59/00; B63B 59/06; B63B 59/08; B63B 59/10; G01N 29/11; G01N 29/225
USPC ............................. 114/221 R, 222; 901/1, 44
See application file for complete search history.

(56) References Cited

U.S. PATENT DOCUMENTS 2,104,062 A 1/1938 Temple
2,132,661 A 10/1938 Temple
(Continued)

FOREIGN PATENT DOCUMENTS

CN 2405719 11/2000
CN 2552648 5/2003
(Continued)

OTHER PUBLICATIONS

A Copenhagen Climate Treaty; Version 1.0 Draft; A Proposal for a Copenhagen Agreement by Members of the NGO Community; published Jun. 2009; pp. 1-78 (80 pages total).
(Continued)

*Primary Examiner* — Lars A Olson

(57) ABSTRACT

A method of autonomous hull cleanliness detection includes positioning an autonomous cleanliness detection system over a portion of a hull of a vessel. A cleanliness parameter of the portion of the hull is detected using a detector. The detected cleanliness parameter is compared with a stored cleanliness parameter to obtain a cleanliness differential upon which a cleaning operation or routine may be based and initiated.

22 Claims, 13 Drawing Sheets

(51) Int. Cl.

| | |
|---|---|
| B63B 59/08 | (2006.01) |
| B62D 55/265 | (2006.01) |
| B62D 55/32 | (2006.01) |
| B63G 8/00 | (2006.01) |
| G05D 1/00 | (2006.01) |
| G05D 1/02 | (2006.01) |

(56) References Cited

U.S. PATENT DOCUMENTS

| | | |
|---|---|---|
| 2,386,650 A | 10/1945 | Bell |
| 3,088,429 A | 5/1963 | Johannessen |
| 3,285,676 A | 11/1966 | Hetteen |
| 3,439,937 A | 4/1969 | Dixon |
| 3,554,300 A | 1/1971 | Rosenberg |
| 3,638,600 A | 2/1972 | Modrey |
| 3,682,265 A | 8/1972 | Hiraoka et al. |
| 3,777,834 A | 12/1973 | Hiraoka et al. |
| 3,906,572 A | 9/1975 | Winn |
| 3,922,991 A | 12/1975 | Woods |
| 3,934,664 A | 1/1976 | Pohjola |
| 3,946,692 A | 3/1976 | Sierra et al. |
| 3,960,229 A | 6/1976 | Shio |
| 3,984,944 A | 10/1976 | Maasberg et al. |
| 4,046,429 A | 9/1977 | Pohjola |
| 4,079,694 A | 3/1978 | Galinou |
| 4,119,356 A | 10/1978 | Pohjola |
| 4,135,492 A | 1/1979 | Heitland |
| 4,135,592 A | 1/1979 | Wincent |
| 4,202,453 A | 5/1980 | Wilkes |
| 4,251,791 A | 2/1981 | Yanagisawa et al. |
| 4,401,048 A | 8/1983 | Rogers |
| 4,444,146 A | 4/1984 | DeWitz et al. |
| 4,574,722 A | 3/1986 | Orita et al. |
| 4,674,949 A | 6/1987 | Kroczynski |
| 4,690,092 A | 9/1987 | Rabuse |
| 4,697,536 A | 10/1987 | Hirata |
| 4,697,537 A | 10/1987 | Smith |
| 4,734,954 A | 4/1988 | Greskovics et al. |
| 4,736,826 A | 4/1988 | White et al. |
| 4,788,498 A | 11/1988 | Uemura |
| 4,789,037 A | 12/1988 | Kneebone |
| 4,809,383 A | 3/1989 | Urakami |
| 4,841,894 A | 6/1989 | Nellessen, Jr. |
| 4,890,567 A | 1/1990 | Caduff |
| 4,926,775 A | 5/1990 | Andorsen |
| 5,048,445 A | 9/1991 | Lever et al. |
| 5,174,222 A | 12/1992 | Rogers |
| 5,203,646 A | 4/1993 | Landsberger et al. |
| 5,249,631 A | 10/1993 | Ferren |
| 5,253,605 A | 10/1993 | Collins |
| 5,253,724 A | 10/1993 | Prior |
| 5,285,601 A | 2/1994 | Watkin et al. |
| 5,366,038 A | 11/1994 | Hidetsugu et al. |
| 5,378,994 A | 1/1995 | Novak et al. |
| 5,435,405 A | 7/1995 | Schempf et al. |
| 5,569,371 A | 10/1996 | Perling |
| 5,628,271 A | 5/1997 | McGuire |
| 5,831,432 A | 11/1998 | Mohri |
| 5,849,099 A | 12/1998 | McGuire |
| 5,852,984 A | 12/1998 | Matsuyama et al. |
| 5,894,901 A | 4/1999 | Awamura et al. |
| 5,947,051 A | 9/1999 | Geiger |
| 6,000,484 A | 12/1999 | Zoretich et al. |
| 6,053,267 A | 4/2000 | Fisher |
| 6,064,708 A | 5/2000 | Sakamaki |
| 6,102,145 A | 8/2000 | Fisher |
| 6,125,955 A | 10/2000 | Zoretich et al. |
| 6,209,473 B1 * | 4/2001 | Jones et al. .............. 114/222 |
| 6,276,478 B1 | 8/2001 | Hopkins et al. |
| 6,317,387 B1 * | 11/2001 | D'Amaddio et al. ........ 114/222 |
| 6,564,815 B2 | 5/2003 | McGuire |
| 6,595,152 B2 | 7/2003 | McGuire |
| 6,698,375 B2 | 3/2004 | Delfosse |
| 6,698,376 B2 | 3/2004 | Delahousse et al. |
| 6,792,335 B2 | 9/2004 | Ross et al. |
| 6,886,486 B2 | 5/2005 | Van Rompay |
| 6,886,651 B1 | 5/2005 | Slocum et al. |
| 6,974,356 B2 | 12/2005 | Hobson |
| 7,286,214 B2 | 10/2007 | Reinersman et al. |
| 7,290,496 B2 | 11/2007 | Asfar et al. |
| 7,296,530 B1 | 11/2007 | Bernstein et al. |
| 7,390,560 B2 | 6/2008 | Wallach |
| 7,496,226 B2 | 2/2009 | Negahdaripour et al. |
| 7,520,356 B2 | 4/2009 | Sadegh et al. |
| 7,866,421 B2 | 1/2011 | Moore et al. |
| 7,934,575 B2 | 5/2011 | Waibel et al. |
| 8,214,081 B2 | 7/2012 | Choi et al. |
| 8,342,281 B2 | 1/2013 | Rooney, III |
| 8,386,112 B2 | 2/2013 | Rooney, III |
| 8,393,286 B2 | 3/2013 | Rooney, III et al. |
| 8,393,421 B2 | 3/2013 | Kornstein et al. |
| 8,723,536 B2 | 5/2014 | Miyazaki et al. |
| 2003/0000445 A1 | 1/2003 | McGuire |
| 2004/0089216 A1 | 5/2004 | Van Rompay |
| 2004/0133999 A1 | 7/2004 | Walton |
| 2004/0250934 A1 | 12/2004 | Hamdan |
| 2005/0027412 A1 | 2/2005 | Hobson et al. |
| 2005/0156562 A1 | 7/2005 | Cohen et al. |
| 2005/0199171 A1 | 9/2005 | Ecklund |
| 2005/0216125 A1 | 9/2005 | Huston et al. |
| 2006/0175439 A1 | 8/2006 | Steur et al. |
| 2006/0191457 A1 | 8/2006 | Murphy |
| 2006/0249622 A1 | 11/2006 | Steele |
| 2006/0261772 A1 | 11/2006 | Kim |
| 2007/0089916 A1 | 4/2007 | Lundstrom |
| 2007/0276552 A1 | 11/2007 | Rodocker et al. |
| 2007/0284940 A1 | 12/2007 | Koolhiran |
| 2008/0009984 A1 | 1/2008 | Lee et al. |
| 2008/0202405 A1 | 8/2008 | Kern |
| 2008/0276407 A1 | 11/2008 | Schnittman |
| 2008/0281470 A1 | 11/2008 | Gilbert et al. |
| 2008/0300821 A1 | 12/2008 | Frank et al. |
| 2008/0308324 A1 | 12/2008 | Moser et al. |
| 2009/0078484 A1 | 3/2009 | Kocijan |
| 2009/0094765 A1 | 4/2009 | Osaka et al. |
| 2009/0166102 A1 | 7/2009 | Waibel et al. |
| 2009/0301203 A1 | 12/2009 | Brussieux |
| 2010/0000723 A1 | 1/2010 | Chambers |
| 2010/0126403 A1 | 5/2010 | Rooney, III et al. |
| 2010/0131098 A1 | 5/2010 | Rooney, III et al. |
| 2010/0217436 A1 | 8/2010 | Jones et al. |
| 2010/0219003 A1 | 9/2010 | Rooney, III et al. |
| 2010/0238050 A1 | 9/2010 | Rhodes et al. |
| 2011/0050374 A1 | 3/2011 | Dvorak |
| 2011/0067615 A1 | 3/2011 | Rooney, III et al. |
| 2011/0083599 A1 | 4/2011 | Kornstein et al. |
| 2011/0208417 A1 | 8/2011 | Fink et al. |
| 2011/0282536 A1 | 11/2011 | Rooney, III |
| 2012/0006352 A1 | 1/2012 | Holappa et al. |
| 2012/0215348 A1 | 8/2012 | Skrinde |
| 2014/0076223 A1 | 3/2014 | Smith |
| 2014/0076224 A1 | 3/2014 | Smith |
| 2014/0076225 A1 | 3/2014 | Smith |
| 2014/0076226 A1 | 3/2014 | Smith |
| 2014/0077587 A1 | 3/2014 | Smith |
| 2014/0081504 A1 | 3/2014 | Smith |
| 2014/0090906 A1 | 4/2014 | Kornstein et al. |

FOREIGN PATENT DOCUMENTS

| | | |
|---|---|---|
| CN | 1864944 A | 11/2006 |
| CN | 101387687 A | 3/2009 |
| DE | 3611750 | 10/1987 |
| FR | 1352056 A | 2/1964 |
| FR | 2861457 A1 | 4/2005 |
| FR | 2948920 A1 | 2/2011 |
| GB | 2038721 | 7/1980 |
| GB | 2103162 | 2/1983 |
| GB | 2165330 A | 4/1986 |
| JP | S48-014096 | 2/1973 |
| JP | S49-001434 | 1/1974 |
| JP | S50-012797 | 2/1975 |
| JP | S50-81487 U | 7/1975 |

(56) References Cited

FOREIGN PATENT DOCUMENTS

| | | |
|---|---|---|
| JP | 58-012075 | 1/1983 |
| JP | S58-14096 | 1/1983 |
| JP | S60-131174 | 7/1985 |
| JP | S62-130999 | 8/1987 |
| JP | 04-002592 | 1/1992 |
| JP | H05-19086 | 1/1993 |
| JP | 06-099888 | 4/1994 |
| JP | 08-310384 | 11/1996 |
| JP | H10-16884 | 1/1998 |
| JP | 2003025265 | 1/2003 |
| JP | 2005-335882 | 12/2005 |
| WO | WO 99/07489 A1 | 2/1999 |
| WO | WO 02/074611 A2 | 9/2002 |
| WO | WO 02/074611 A3 | 9/2002 |
| WO | WO 2005/014387 | 2/2005 |
| WO | WO 2010/059195 | 5/2010 |
| WO | WO 2010/134022 A1 | 11/2010 |
| WO | WO 2011/022037 | 2/2011 |
| WO | WO 2011015786 A1 | 2/2011 |
| WO | WO 2011/034558 | 3/2011 |
| WO | WO 2011/046592 | 4/2011 |
| WO | WO 2011/142800 | 11/2011 |
| WO | WO 2011/146103 | 11/2011 |
| WO | WO 2012/104109 A1 | 8/2012 |

OTHER PUBLICATIONS

Anti-Fouling Systems; Focus on IMO, International Maritime Organization; UK; 2002; pp. 1-31; http://www.uscg.mil/hq/cg5/cg522/cg5224/docs/FOULING2003.pdf.
Borchardt; Grooming the Fleet, Biofouling Slows Vessels and Wastes Fuels, so the Navy is Looking at an Underwater Robot to Keep its Hulls Shipshape; Mechanical Engineering; Apr. 2010; pp. 33-35; vol. 132, No. 4.
Fernandez; NAFTA and Member Country Strategies for Maritime Trade and Marine Invasive Species; Journal of Environmental Management; 2008; pp. 308-321; vol. 89.
Garelick, et a; RTI International EnSys Energy & Systems, Inc.; Navigistics Consulting; Global Trade and Fuels Assessment—Future Trends and Effects of Designating Requiring Clean Fuels in the Marine Sector: Task Order No. 1; Draft Report; RTI Project No. 0209701.001; Apr. 2006; 82 pages.
Hismar; Hismar News Report No. 2; 2008; http://hismar.ncl.ac.uk/public_docs/News_Reports/News%20Report%20No2_UNEW.pdf; 4 pages.
Hismar; Hull Identification System for Maritime Autonomous Robots; http://hismar.ncl.ac.uk/public_docs/HISMAR_Poster.pdf; 1 page.
Kohli; Biofouling and Design of a Biomimetic Hull-Grooming Tool; Naval Surface Warfare Center Carderock Division; West Bethesda; MD; NSWCCD-CISD-2007/002; Ship Systems Integration & Design Department Technical Report; Sep. 2007; 38 pages.
Man; B&W, Basic Principles of Ship Propulsion; Basics of Ship Propulsion; Apr. 2004; pp. 1-30.
Munk; Fuel Conservation Through Managing Hull Resistance; Motorship Propulsion Conference; Copenhangen; Apr. 26, 2006; pp. 1-10.
Paik et al.; Condition Assessment of Aged Ships; Proceedings of the 16th International Ship and Offshore Structures Congress; Dec. 31, 2006; pp. 273-283; vol. 2; The 16th International Ship and Offshore Structures Congress, Southampton, UK.
Preiser et al.; Energy (Fuel) Conservation Through Underwater Removal and Control of Fouling on Hulls of Navy Ships, Naval Research and Development Center, Materials Department, Annapolis, Research and Development Report, Dec. 1975; 52 pages.
Reed et al; Automatic Ship Hull Inspection Using Unmanned Underwater Vehicles; Proceedings from the 7th International Symposium on Technology and the Mine Problem; Monterey, USA; May 2006; 10 pages.
Rosenhahn et al; Advanced Nanostructures for the Control of Biofouling: the FP 6 EU Integrated Project AMBIO; Biointerphases; Mar. 2008; Published Feb. 21, 2008; pp. IR1-IR5; vol. 3; No. 1.
Serene et al; Design of a Remotely Operated Vehicle (ROV) for Underwater Ship Hull Cleaning; National University of Singapore; pp. 1-6; 2003.
Tallett et al; Potential Marine Fuels Regulations: Impacts on Global Refining; Costs & Emissions; Joint IFQC & IPIECA Roundtable; Impacts of $CO_2$ Emissions form Refining & Shipping; London, England; Oct. 1, 2007; 17 pages.
Townsin; The Ship Hull Fouling Penalty; Biofouling; Jan. 2003; pp. 9-15; vol. 19 (supplement).
Vaganay et al; Ship Hull Inspection with the HAUV: US Navy and NATO Demonstrations Results; Oceans 2006; Sep. 2006; pp. 1-6.
Yuan et al.; The Design of Underwater Hull-Cleaning Robot; Journal of Marine Science and Application; Jun. 2001; pp. 41-45; vol. 3; No. 1.
Written Opinion of the International Searching Authority, International Application No. PCT/US2011/000787, Jul. 20, 2011, 7 pgs. (unnumbered).
Written Opinion of the International Searchign Authority, International Application No. PCT/US2011/000770, Aug. 9, 2011, 5 pgs. (unnumbered).
Written Opinion of the International Searching Authority, International Application No. PCT/US2010/002163, Oct. 13, 2010, 5 pgs. (unnumbered).
Written Opinion of the International Searching Authority, International Application No. PCT/US2010/002164. Oct. 8, 2010, 5 pgs. (unnumbered).
Written Opnion of the International Searching Authority for PCT Application No. PCT/US2009/006122 mailed Feb. 3, 2010 9 (seven pages).
Written Opinion of the International Searching Authority, International Application No. PCT/US2010/002693, Dec. 9, 2010, 8 pages (unnumbered).
PCT Application PCT/US2010/02693; filing date Oct. 6, 2010; Raytheon Company; International Search Report mailed Dec. 9, 2010.
PCT Application PCT/US2011/000787 filing date May 5, 2011; James H. Rooney; International Search Report mailed Jul. 20, 2011.
PCT Application PCT/US2011/000770; filing date May 3, 2011; James H. Rooney III; International Search Report mailed Aug. 9, 2011.
PCT Application PCT/US2010/002163; filing date Aug. 4, 2010; James H. Rooney; International Search Report mailed Oct. 13, 2010.
PCT Application PCT/US2010/002164; filing date Aug. 4, 2010; James H. Rooney; International Search Report mailed Oct. 8, 2010.
PCT Application PCT/US2009/006122; filing date Nov. 16, 2009; James H. Rooney III; International Search Report mailed Feb. 3, 2010.
PCT Application PCT/US2013/059552; filing date Sep. 12, 2013; Raytheon Company; International Search Report mailed Dec. 20, 2013.
PCT Application PCT/US2013/059552; filing date Sep. 12, 2013; Raytheon Company; International Search Report mailed Feb. 21, 2014.
PCT Application PCT/US2013/059527; filing date Sep. 12, 2013; Raytheon Company; International Search Report mailed Mar. 3, 2014.
PCT Application PCT/US2013/059548; filing date Sep. 12, 2013; Raytheon Company; International Search Report mailed Apr. 16, 2014.
PCT Application PCT/US2013/059551; filing date Sep. 12, 2013; Raytheon Company; International Search Report mailed Mar. 10, 2014.
PCT Application PCT/US2013/059546; filing date Sep. 12, 2013; Raytheon Company; International Search report mailed Jan. 20, 2014.
PCT Application PCT/US2013/059527; filing date Sep. 12, 2013; Raytheon Company; International Search Report mailed May 13, 2014.

(56) References Cited

OTHER PUBLICATIONS

PCT Application PCT/US2013/059550; filing date Sep. 12, 2013; Raytheon Company; International Search Report mailed Jun. 3, 2014.
PCT Application PCT/US2013/059548; filing date Sep. 12, 2013; Raytheon Company; International Search Report mailed Jun. 30, 2014.
EP Application EP09827853; filed Aug. 11, 2011; Raytheon Company; Supplemental European Search Report Apr. 23, 2014.
U.S. Appl. No. 12/313,643, filed Nov. 21, 2008; James H. Rooney III; office action dated Sep. 17, 2012.
U.S. Appl. No. 12/583,346, filed Aug. 19, 2009; James H. Rooney III; office action dated Sep. 25, 2012.
U.S. Appl. No. 12/313,643, filed Nov. 21, 2008; James H. Rooney III; office action issued Apr. 13, 2012.
U.S. Appl. No. 12/586,248, filed Sep. 18, 2009; James H. Rooney III office action issued May 24, 2012.
U.S. Appl. No. 12/587,949, filed Oct. 14, 2009; Howard R. Kornstein; office action issued May 25, 2012.
U.S. Appl. No. 12/800,174, filed May 10, 2010; James H. Rooney III; office action issued Feb. 24, 2012.
U.S. Appl. No. 12/583,346, filed Aug. 19, 2009; James H. Rooney, III; office action dated Feb. 27, 2013.
U.S. Appl. No. 12/583,346, filed Aug. 19, 2009; James H. Rooney III; office action dated Feb. 27, 2014.
U.S. Appl. No. 12/586,248, filed Sep. 18, 2009; James H. Rooney III; office action mailed Dec. 13, 2011.
U.S. Appl. No. 12/586,248, filed Sep. 18, 2009; James H. Rooney III; Notice of Allowance issued Oct. 24, 2012.
U.S. Appl. No. 12/587,949, filed Oct. 14, 2009; Howard R. Kornstein; notice of allowance mailed Sep. 21, 2012.
U.S. Appl. No. 12/800,486, filed May 17, 2010; James H. Rooney III; notice of allowance dated Sep. 27, 2012.
U.S. Appl. No. 12/800,174; dated May 10, 2010; James H. Rooney III; notice of allowance dated Aug. 17, 2012.
U.S. Appl. No. 13/313,643, filed Nov. 21, 2008; James H. Rooney III; office action dated Feb. 26, 2014.
U.S. Appl. No. 13/794,594, filed Mar. 11, 2013; Howard R. Kornstein; office action dated May 1, 2014.
U.S. Appl. No. 13/794,594, filed Mar. 11, 2013; Howard R. Kornstein; office action dated Oct. 15, 2014.
U.S. Appl. No. 13/769,344, filed Feb. 17, 2013; Fraser M. Smith; office action dated Oct. 28, 2014.
Hover et al.; A Vehicle System for Autonomous Relative Survey of In-Water Ships; Marine Technology Society Journal; Jul. 2007; pp. 44-55; vol. 41, No. 2; Marine Technology Society, Washington, D.C.
Menegaldo et al.; Development and Navigation of a Mobile Robot for Floating Production Storage and Offloading Ship Hull Inspection; IEEE Transactions on Industrial Electronics; Sep. 2009; pp. 3717-3722; vol. 56, No. 9; IEEE Service Center, Piscataway, New Jersey.
Vaganay et al.; Hovering Autonomous Underwater Vehicle-System Design Improvements and Performance Evaluation Results; $30^{th}$ International Symposium on Unmanned Untethered Submarine Technology; Jul. 9, 2009; pp. 1-14.
EP Application 11783852.4; filing date May 5, 2011; Raytheon Company; European Search Report; dated Aug. 18, 2014.
U.S. Appl. No. 13/769,339, filed Feb. 17, 2013; Fraser M. Smith; office action dated Sep. 3, 2014.
U.S. Appl. No. 13/769,342, filed Feb. 17, 2013; Fraser M. Smith; office action dated Sep. 10, 2014.
U.S. Appl. No. 13/769,345, filed Feb. 17, 2013; Fraser M. Smith; office action dated Sep. 16, 2014.
U.S. Appl. No. 12/313,643, filed Nov. 21, 2008; James H. Rooney III; office action dated Aug. 25, 2014.
U.S. Appl. No. 12/583,346, filed Aug. 19, 2009; James H. Rooney III; office action dated Aug. 26, 2014.
U.S. Appl. No. 13/769,345, filed Feb. 17, 2013; Fraser M. Smith; Notice of Allowance mailed Jan. 12, 2015.
U.S. Appl. No. 13/769,339; filing date Feb. 17, 2013; Fraser M. Smith; Notice of Allowance mailed Jan. 30, 2015.
U.S. Appl. No. 13/794,594; filing date Mar. 11, 2013; Howard R. Kornstein; office action dated Mar. 4, 2015.
U.S. Appl. No. 13/769,344; filing date Feb. 17, 2013; Fraser M. Smith; office action dated Mar. 10, 2015.
U.S. Appl. No. 13/769,342; filing date Feb. 17, 2013; Fraser M. Smith; office action dated Mar. 10, 2015.
U.S. Appl. No. 12/313,643; filing date Nov. 21, 2008; James H. Rooney III; office action dated Apr. 8, 2015.
U.S. Appl. No. 12/583,346; filing date Aug. 19, 2009; James H. Rooney III; office action dated Apr. 8, 2015.

\* cited by examiner

HULL ROBOT FOR AUTONOMOUSLY DETECTING CLEANLINESS OF A HULL

RELATED APPLICATIONS

This application claims the benefit of the following provisional patent applications, the contents of each of which are incorporated herein by reference in their entirety: U.S. provisional patent application Ser. No. 61/701,512, filed on Sep. 14, 2012; provisional patent application Ser. No. 61/701,517, filed on Sep. 14, 2012; U.S. provisional patent application Ser. No. 61/701,523, filed on Sep. 14, 2012; U.S. provisional patent application Ser. No. 61/701,529, filed on Sep. 14, 2012; U.S. provisional patent application Ser. No. 61/701,534, filed on Sep. 14, 2012; and U.S. provisional patent application Ser. No. 61/701,537, filed on Sep. 14, 2012.

This application is related to copending nonprovisional U.S. patent application Ser. No. 13/769,339, filed on Feb. 17, 2013, and entitled, "Autonomous Hull Inspection"; Ser. No. 13/769,342, filed on Feb. 17, 2013, and entitled "Autonomous Hull Navigation"; Ser. No. 13/769,344, filed on Feb. 17, 2013, and entitled, "Hull Cleaning Robot"; Ser. No. 13/769,345, filed on Feb. 17, 2013, and entitled, "Hull Robot With Hull Separation Countermeasures"; and Ser. No. 13/769,346, filed on Feb. 17, 2013, and entitled, "Magnetic Track", the contents of each of which is hereby incorporated by reference herein in their entirety.

This application is also related to the following copending U.S. patent application Ser. No. 12/313,643, filed on Nov. 21, 2008; Ser. No. 12/583,346, filed on Aug. 19, 2009; Ser. No. 12/586,248, filed on Sep. 18, 2009; Ser. No. 12/587,949, filed on Oct. 14, 2009; and Ser. No. 12/800,486 filed on May 17, 2010; the contents of each of which is hereby incorporated herein by reference in their entirety.

BACKGROUND

The frictional resistance of a vessel hull as it moves through the water can constitute 45% to 90% of the total resistance experienced by the vessel and may be increased by 6% up to 80% due to fouling of the hull by algae, sea grass, barnacles, and the like. As an example, an added resistance of 30% due to moderate bio-fouling of a tanker hull can increase the fuel consumption of the vessel by up to twelve tons per day. The result is added cost to operate the vessel, as well as increased emissions.

Accordingly, there are a variety of methods employed to reduce the likelihood of bio-fouling and/or to rid vessel hulls of bio-fouling through cleaning. For example, anti-fouling hull paints and coatings are often used in an effort to decrease the likelihood of bio-fouling, but such treatments do not always work reliably and can require frequent periodic applications. Such methods can be associated with significant cost as the vessel often must be dry docked for an extensive period of time while the paint and/or coating is applied. There are also environmental concerns with anti-fouling paints and coatings.

It is common, while a vessel is dockside and/or during normal unloading conditions, that the hull be periodically cleaned manually (e.g., by scuba divers) using motorized brushes. However, the cost of such a cleaning procedure is also high as this type of cleaning effort can be needed often. In some cases, manual hull cleaning procedures are commissioned every ten to twenty months, and in other cases even sooner if needed. Unfortunately, there are significant drawbacks to manual cleaning methods. For instance, as the procedure is carried out while the vessel is dockside, cleaning residue and debris (e.g., paint chips, etc.) are disposed in the shallow waters surrounding the docks. Because of this, many jurisdictions have made this practice illegal, particularly due to the toxicity of anti-fouling paint which contaminates the water.

In response, a type of robotic hull cleaners has been proposed. The "Hismar" consortium, for example, has proposed a robotic platform for hull cleaning during normal unloading conditions. The robot is magnetically attached to the hull when the vessel is stationary and is tethered to an operator control unit, a high pressure water source, a suction subsystem, and a power subsystem. Various other tethered robots have also been proposed. Despite some of their advantages over manual cleaning procedures, most prior hull cleaning robots suffer from various shortcomings. For instance, such robots are connected to a cable and powered and controlled by an on-board power supply and control system and are able to operate only on a stationary vessel. Further, inspection techniques for determining the cleanliness of the hull are absent or inefficient.

SUMMARY

A method of autonomous hull cleanliness detection in accordance with an example includes positioning an autonomous cleanliness detection system over a portion of a hull of a vessel. A cleanliness parameter of the portion of the hull is detected using a detector. The detected cleanliness parameter is compared with a stored cleanliness parameter to obtain a cleanliness differential. If it is determined that the cleanliness differential exceeds a predetermined threshold or range or amount, then a cleaning sequence can be initiated and performed by a cleaning subsystem.

In another example, a hull cleanliness detection robot is described for autonomously detecting a cleanliness of a hull. The robot includes a robot body, a drive subsystem onboard the robot for driving and maneuvering the robot about the hull, and an autonomous cleanliness detection system. The autonomous cleanliness detection system can be configured to non-invasively or non-destructively detect the cleanliness of the hull by detecting a cleanliness parameter of a portion of the hull using a detector and comparing the detected cleanliness parameter with a stored cleanliness parameter of the portion of the hull to obtain a cleanliness differential.

In accordance with another example, an autonomous hull cleanliness detection system is described, which includes a non-destructive detector or detector system onboard a device navigable over a hull of a vessel. A database onboard the device is in communication with the detector and is configured to store hull cleanliness data obtained by the detector. A cleanliness standard module is in communication with the detector and the database. The cleanliness standard module is configured to establish a standard of cleanliness by storing the hull cleanliness data obtained by the detector in the database when the hull is substantially clean. A cleanliness detection module is in communication with the detector and the database. The cleanliness detection module is configured to store the hull cleanliness data obtained by the detector in the database when a cleanliness state of the hull is substantially unknown. A processor onboard the device is in communication with the database. The processor is configured to compare the hull cleanliness data stored by the cleanliness standard module with the data stored by the cleanliness detection module to obtain a cleanliness differential.

DETAILED DESCRIPTION

Figure 1:
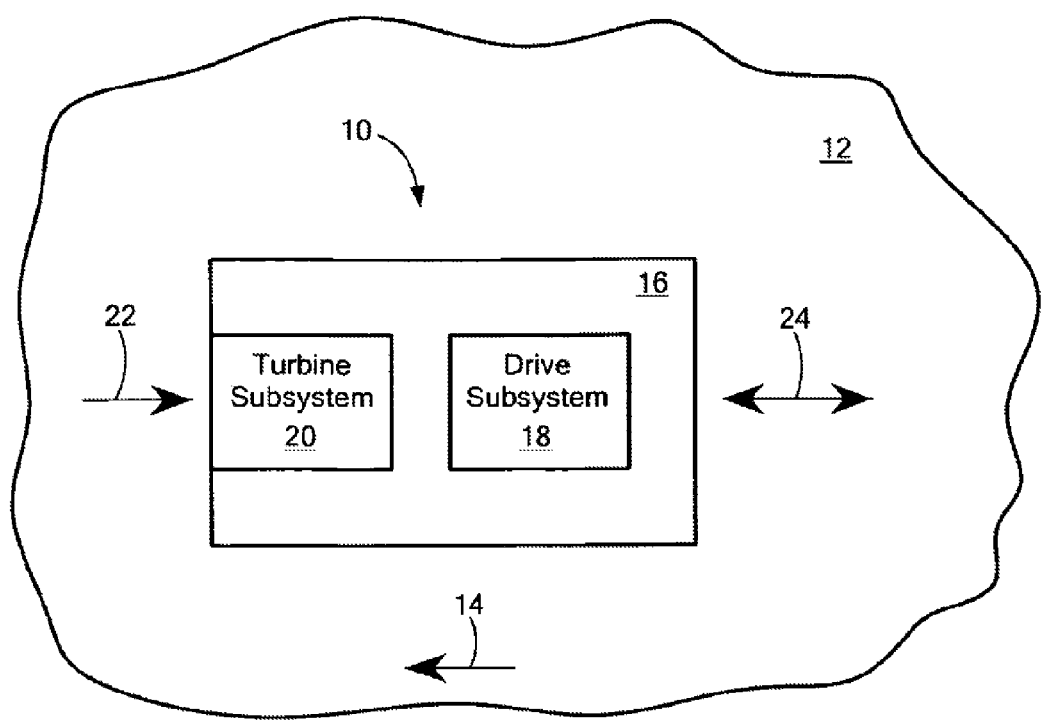
FIG. 1 is a block diagram of a hull robot in accordance with an embodiment of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

The following terminology will be used in accordance with the definitions set forth below.

As used herein, "robot body" is intended as a broad term to define one or more structural components (e.g., a frame, chassis, covering or shell, etc.) capable of supporting one or more other components of a hull robot or its subsystems, and/or capable of providing covering and/or concealment of one or more components or subsystems of the hull robot.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Example Embodiments

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

It is noted in the present disclosure that when describing the system, or the related devices or methods, individual or separate descriptions are considered applicable to one another, whether or not explicitly discussed in the context of a particular example or embodiment. For example, in discussing an energy harvester configuration per se, the device, system, and/or method embodiments are also intended to be included in such discussions, and vice versa, where applicable.

Furthermore, various modifications and combinations can be derived from the present disclosure and illustrations, and as such, the referenced figures should not be considered limiting.

Various systems and methods have been proposed for cleaning a surface of a hull of a vessel. However, such systems and methods generally presuppose a knowledge or expectation that a hull has an undesired amount of fouling. For example, in some methods cleaning is performed after a manual inspection of the hull to determine whether and to what extent fouling is present. As another example, routine cleaning operations may be scheduled periodically without deference to an actual amount of fouling on the hull (there is often an assumption that after the period of time has elapsed the fouling will be present). Where robotic or other cleaning devices are used to clean the hull of a vessel upon manual inspection or expiration of the time period dictating that cleaning be performed, the robotic devices will perform the cleaning operation substantially uniformly across the entirety of the hull without respect to whether a particular area has more or less fouling or could use more or less cleaning than another particular area. These and other shortcomings result in inefficiencies and ineffective use of resources.

In one example, a hull cleanliness detection robot is described herein which addresses the deficiencies of previous systems and methods. More specifically, a robot for autonomously detecting a cleanliness of a hull is described in accordance with an example embodiment of the present technology. To summarize this example, the robot can include a robot body, a drive subsystem onboard the robot for driving and maneuvering the robot about the hull, and an autonomous cleanliness detection system. The autonomous cleanliness detection system can be configured to non-invasively or non-destructively detect the cleanliness of the hull by detecting a current or real-time cleanliness parameter of a portion of the hull using a detector and comparing the detected cleanliness parameter with a stored cleanliness parameter (e.g., a predetermined standard) of the portion of the hull to determine if a cleanliness differential exists that would warrant cleaning. If the cleaning differential exceeds a predetermined threshold amount or range of acceptable values, then a cleaning operation or routine can be initiated by a cleaning subsystem of the hull robot to clean the hull. By non-invasively or non-destructively it is meant that detection can be done in a manner so as to not damage the surface of the ship's hull, or the paint layer covering the hull.

FIG. 1 illustrates what is representative of a robot 10 on a vessel (e.g., a ship) hull 12 underway in the direction of vector 14. Robot body 16 houses a drive subsystem 18 and a turbine subsystem 20. Fluid (e.g., water) moves past the hull 12 in the direction of vector 22 due to the motion of the vessel. In accordance with the subject invention, the turbine subsystem 20 is actuatable (e.g., driven) by the moving fluid and used to operate at least a drive subsystem 18. In an example not shown in FIG. 1, a water wheel subsystem having water contacting or receiving members, such as buckets or blades, may be used in place of the turbine subsystem to operate the drive subsystem. The turbine subsystem and water wheel subsystem are non-limiting examples of rotation-based extractors for use with the present technology. It is contemplated that other systems can also be used to harness the power of passing water. For example, a fixed or hinged flapper device having a piezoelectric element can operate as an oscillation-based energy extractor for extracting a usable electric signal for powering the system or devices in the system, or for charging a battery carried by the system.

The result is a robot able to maneuver, at a minimum, in the directions about hull 12 as shown by arrows 24. Furthermore, the robot is able to maneuver in one or more controlled paths about the hull which are not necessarily aligned with vector 14 and which are in addition to the directions shown by arrows 24. The robot can be powered by the action of the water flowing past the hull while the vessel is underway. In this way, cleaning and/or inspection and the like can be undertaken even continuously while the vessel is in operation. The robot can thus be configured to harvest energy for operation from the action of a fluid flowing over the hull and about or past the robot.

Typically, other subsystems can be included as components of robot 10, for example, a cleaning subsystem, a navigation subsystem, a communications subsystem, and the like. Moreover, although certainly possible in some embodiments, in many embodiments the robot body 16 need not be tethered to any kind of power or control subsystem. The turbine subsystem can operate drive subsystem 18 (and, in one example, a cleaning subsystem) directly or via a generator charging a power subsystem (e.g., a battery pack) which supplies power to one or more motors driving the drive subsystem and/or the cleaning subsystem. The battery pack can also be used to energize the other electronic and/or electromechanical subsystems associated with the robot. In one aspect, the generator may drive one or more motors directly.

Figure 2:
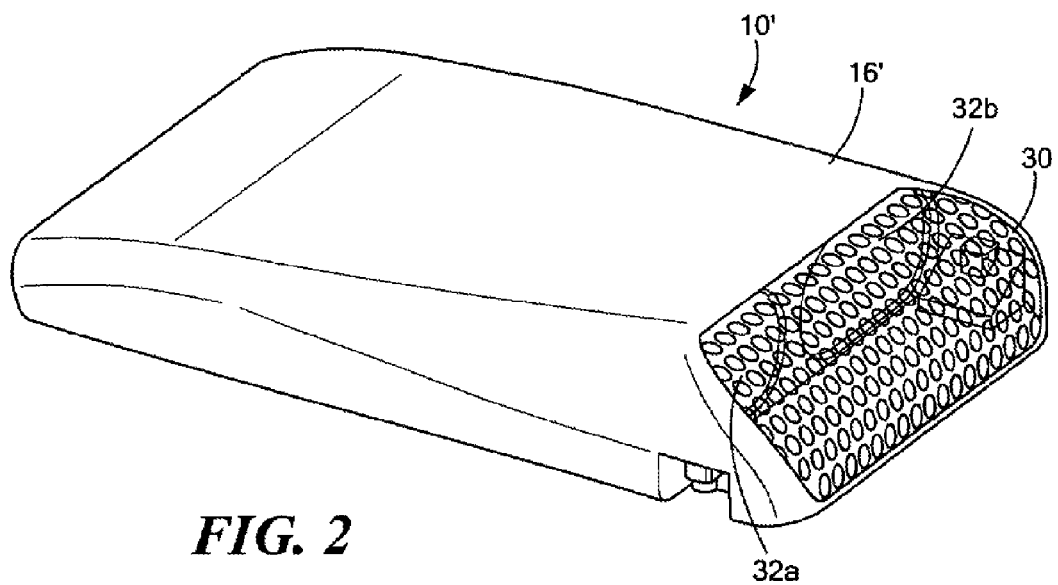
FIG. 2 is a top perspective view of a hull robot in accordance with an embodiment of the present technology.

In one particular example, the robot 10', shown in FIG. 2, includes a body 16' with a flow inlet filter screen 30. Body 16 can comprise any number of hydrodynamic or other shapes or configurations. As such, the shape or configuration illustrated is not meant to be limiting in any way. The shape or configuration can be designed to urge the robot against the hull, when the robot is deployed on the hull, as water moves over the robot due to the action of the ship moving through the water. In other words, depending upon the particular hydrodynamics of the robot, water passing over the robot can induce a downward force on the robot that urges the robot against the hull, thus helping to secure the robot to the hull.

Figure 3:
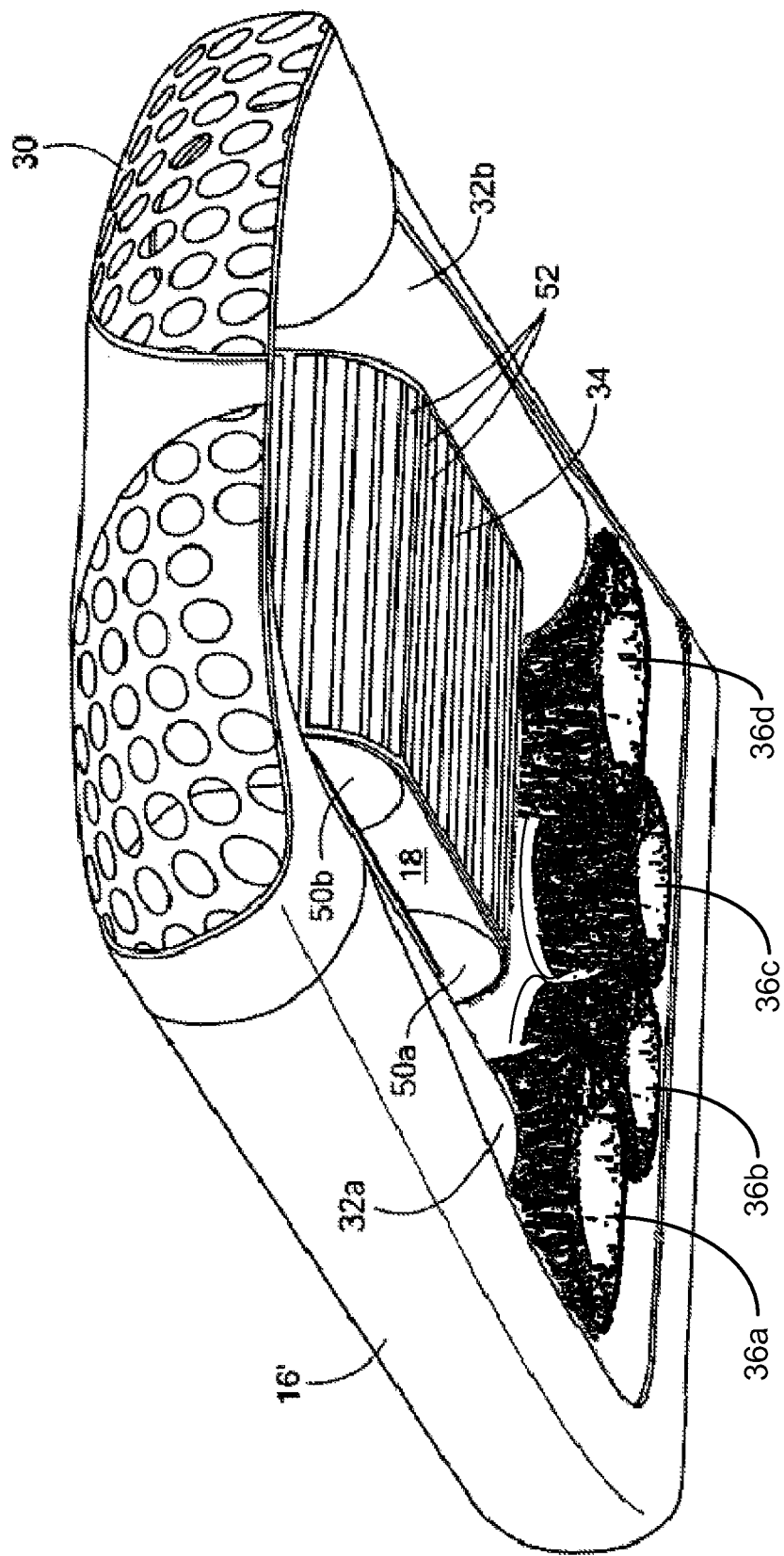
FIG. 3 is a bottom perspective view of a hull robot in accordance with an embodiment of the present technology.

Referring to FIG. 3, the intakes of turbines 32a and 32b can be behind the screen 30. The intakes of turbines 32a and 32b can be exposed, via screen 30, to fluid moving past the hull. In this example, robot housing 16 is approximately thirty-six inches long, twenty-four inches wide, and six inches tall.

Figure 4:
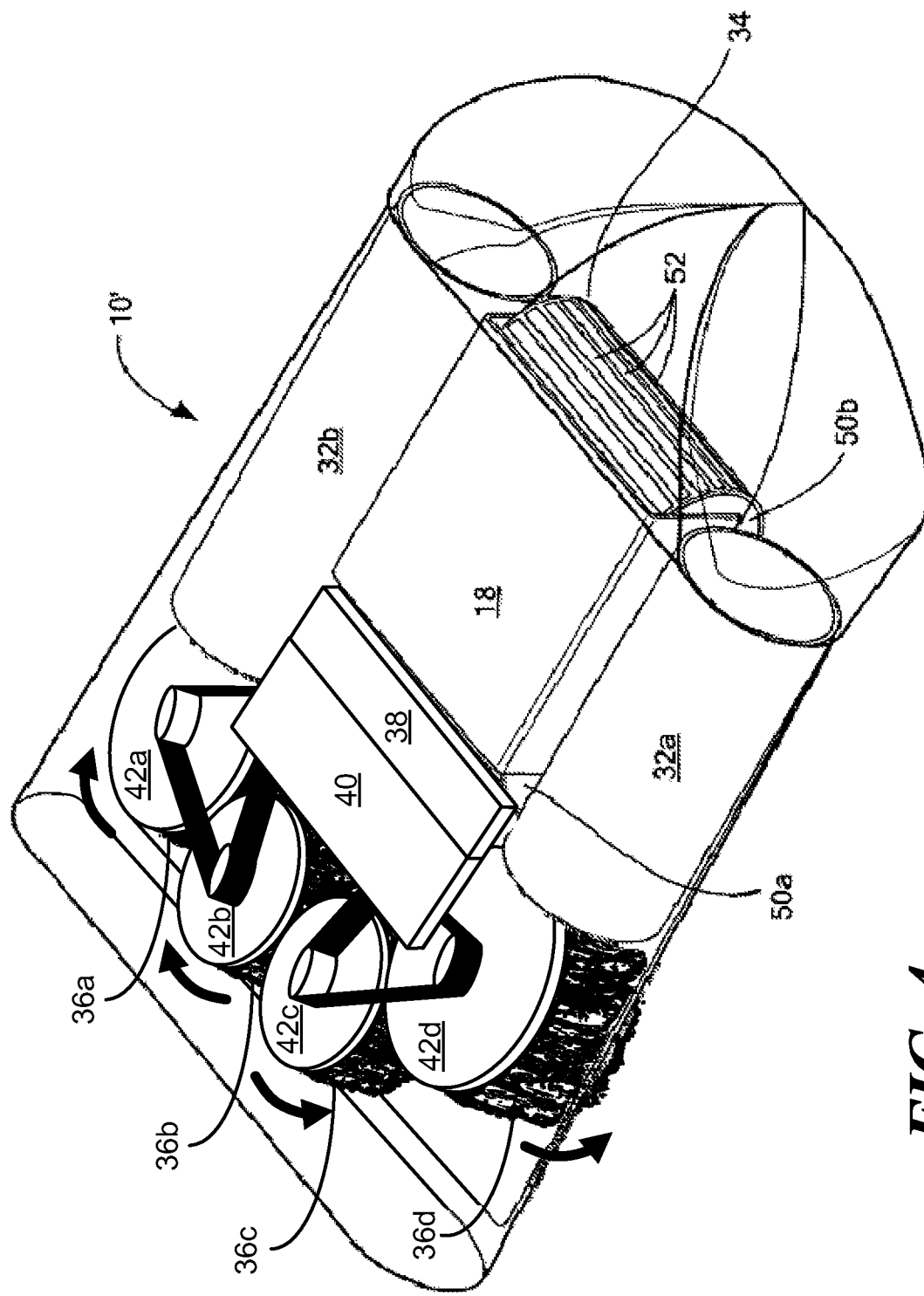
FIG. 4 is a top perspective view of a hull robot in accordance with an embodiment of the present technology where a robot body is transparent for illustrative purposes.

The drive subsystem in this example includes at least one drive track 34 configured to facilitate locomotion of the robot 10 about the hull, and to hold the robot on the hull as the robot maneuvers. In one aspect, multiple drive tracks may be provided. Cleaning brushes 36a-36d can be included for cleaning the hull of the vessel. A battery pack and/or electronic control module can also be included. The brush(es) may be driven by gear drives, which may in turn be driven by the shaft of one of the turbines 32a or 32b, or by a motor in an embodiment where the shaft of turbine 32b drives a generator providing power to battery pack for the operation of the motor. For example, FIG. 4 illustrates an embodiment where the cleaning brushes 36c-36d are rotated using a belt and pulley system actuated by the motor 40 (which may be powered by power source 38), where some brushes 36a-36b counter-rotate relative to other brushes 36c-36d. Any number of brushes or cleaning elements may be used to suit a particular application, such as a greater or lesser number of brushes, for example. Other cleaning subsystems are also contemplated. For example, the robot could include a squeegee, a passive cleaning pad, water jets, and the like. Where a passive cleaning apparatus is used, power in the form of electricity or torque generated by the turbine subsystem would not generally be used to operate the cleaning apparatus.

Turbine 32a can be used to drive a track roller directly in the case where the shaft of turbine 32a is coupled to the track roller via a drive. But, preferably, the shaft of turbine 32a is coupled to a generator powering motor which drives the track roller.

In one example, an endless belt 34 is disposed over rollers 50a and 50b and includes magnets and/or magnetic materials 52 embedded (e.g., encapsulated) in the material of the belt, which can be made of rubber. Such a magnetic belt may effectively secure the robot to the hull of the vessel. Other magnetic subsystems used to engage a robot with the hull of a vessel are also contemplated.

In a specific example, the shaft of turbine 32a is coupled to a drive train which drives track roller, and the shaft of turbine 32b is coupled to another drive train which drives one or more cleaning brushes via belts and pulleys or gearing. Other means for operating the at least one drive track and the cleaning apparatus are also contemplated. For example, the shaft of the turbine, or the drive train to which the turbine is coupled, may be coupled to a battery or energy harvesting device.

Various cleanliness detection systems and methods can be incorporated into the hull robot for detecting the cleanliness of a ship's hull. For example, such systems may include a sensor and/or feedback element that relays detected information to the hull robot. Such information may further be used to determine the rate of advancement for cleaning. For example, some areas of the ship may have a greater amount of fouling or more difficult-to-clean fouling. Rather than treat such areas similarly as areas with lesser fouling or easier-to-clean fouling, it may be desirable to continue cleaning particular areas until the area is adequately cleaned before advancing to another area. Additionally, the sensor and/or feedback system may be useful in determining which type of cleaning element(s) to deploy to clean different areas of the ship, or even different cleaning elements to clean a particular area of the ship (e.g., in the event a particularly obstinate area or location is encountered). As such, the robot may include multiple different types of cleaning devices, apparatuses, systems, and/or elements that can be selectively employed or deployed. For example, brushes with differing bristle hardnesses or materials, or which rotate differently may be deployed depending on the degree of fouling, for example. Other types of cleaning elements which may be included include one or more squeegees or scrapers (e.g., those having a different hardness or durometer, or that are oriented in different orientations). Water jets, ultrasonic cleaning devices, etc. can also be included. Virtually any device suitable for suitably cleaning a ship hull may be included in the robot and deployed in any combination with any other device as desired.

One or more detectors can be included in the robot to determine the degree and/or location of fouling on the ship hull. Such detectors can include any of a variety of different types and/or combinations of detectors. A non-exhaustive list of example detectors contemplated herein includes a friction detector, a conduction detector, an optical detector, a hardness detector, an acoustic detector, a chemical detector, and so forth. Example robot implementations employing these various detectors will be described below.

It is noted herein that cleanliness detection about a vessel hull can be carried out using any one of the systems and methods discussed herein. Moreover, in some applications, it may be necessary to employ multiple different types of detectors or cleanliness detection systems, and their associated cleanliness detection methods, in the event a single cleanliness detection system and method is found insufficient for whatever reason. As such, simultaneous, successive or redundant use of combinations of cleanliness detection systems and methods are contemplated herein.

Referring to FIG. 4, a cutaway view of a hull robot is shown with a friction detector, or rather a detector configured to detect the friction experienced by a cleaning element (e.g., brushes 36a-36d, squeegee, etc.) against the surface of the hull, where the detected friction represents a cleanliness parameter. The cleaning element may be supported by the robot body. In one example, friction may be detected by measuring electrical current in a motor 40 of the cleaning element. Use of an increased electrical current may be indicative of greater resistance to cleaning operations of the cleaning element. An ammeter may be included in the motor or coupled to the motor to monitor the current used to operate the cleaning element. In operation, periodic or continuous measurements may be taken and current monitored in any given cleaning element. Real-time, in operation current readings may be compared against known values obtained with the hull robot operating on a clean hull surface. If the current measurement falls outside a pre-determined acceptable range, this may be indicative of increased friction between the cleaning element and the hull surface, and an area having some degree of fouling, and the robot can be made to clean that particular area until the current readings are again within the acceptable limit.

Figure 5:
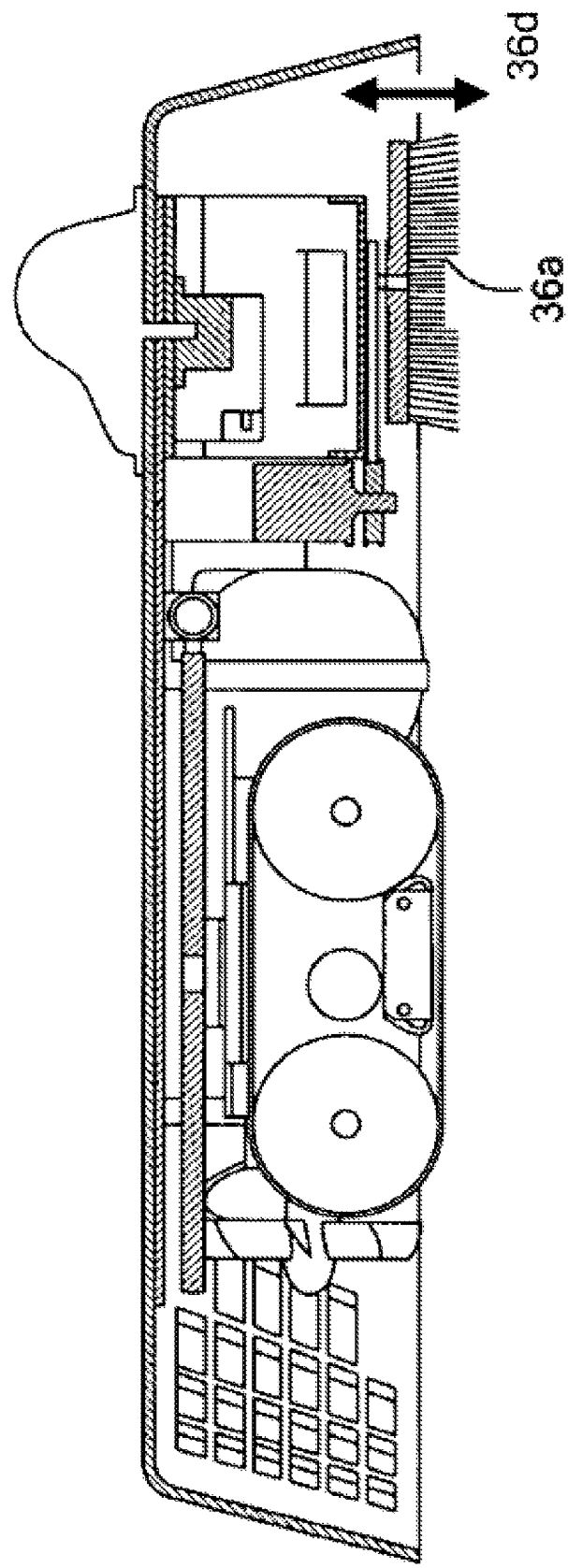
FIG. 5 is a cross-sectional side view of a hull robot in accordance with an embodiment of the present technology.

Friction within any one of the on-board cleaning elements may also be measured using other parameters. As another example, load or torque sensors 42a-42c may be provided on the cleaning element(s). Some example existing cleaning elements that could be used to monitor friction include brushes, squeegees, scrapers, ultrasonic cleaners, and so forth. In one aspect, the load or torque sensors can detect the load or torque applied to the brush or other cleaning element merely to operate the element. In another aspect, the load or torque sensors can detect a load or torque of the cleaning element against a clean hull. A different or discrepant load or torque value, than these known, pre-determined values, that is measured during operation of the hull robot will generally be indicative of a degree of fouling. For example, referring to FIG. 5, a cleaning element 36a may be positioned at a desired position relative to the hull. When a biolayer is present, the biolayer will apply a force 36d on the cleaning element away from the hull due to the additional thickness between the cleaning element and the hull. This force can be detected and quantified to determine a degree of fouling, and therefore an appropriate cleaning operation or routine.

The friction associated with a clean painted hull is different than the friction associated with a hull with a biolayer built up on it. The presence of a biolayer of fouling generally can result in lower friction detected by the detector/sensor. A shear sensor (e.g., a sensor that measures the force used to slide a surface of an object over the hull) can be deployed or used such that the shear force on an immersed painted hull can be known. The detected or measured shear force can be compared with a pre-determined reference shear force obtained on a clean, painted hull surface, such that a discrepancy with respect to the reference shear force can indicate the presence of a biolayer. The shear force can be caused by the motion of the hull cleaner relative to the hull surface or it can be generated at the sensing site and possess a frequency from very low (i.e., just above zero Hz) to ultrasonic.

As yet another example of friction detection, the robot may include a separate dedicated friction detecting element independent of the cleaning element(s) or motor. For example, a roller, scraper, or other suitable device may be in contact with the hull to determine the presence of fouling.

In some examples, the cleaning element 36a and/or friction detecting element may comprise the ability to adjust a pressure 36d (e.g., normal force) exerted against the hull for calibration or to adjust a degree of cleaning. However, such pressure is preferably held constant when performing a friction analysis/detection.

In order to determine whether fouling is present and cleaning is desired, it is helpful to first establish a standard against which further detection of fouling is compared. For example, the detector can be used to measure the friction of the cleaning element or friction detecting element against a clean (and typically painted) hull. The friction detected on a clean hull can be used as a baseline friction standard against which subsequent friction detection operations can be compared. When a subsequent friction detection operation detects a friction different from that of the clean hull friction standard (i.e., detection of a cleanliness differential), the robot can either automatically begin or initiate a cleaning operation, or may determine or estimate a degree of fouling based on the extent of the cleanliness differential between the standard and the currently detected friction. A cleanliness differential may typically signify fouling. However, in the interests of efficiency, a cleaning operation may be performed when the cleanliness differential is greater than a predetermined amount or degree. For example, a very slight differential may not sufficiently warrant the use of resources to clean the hull, whereas a large differential may signify substantial fouling where an appropriate cleaning operation or routine is to be employed.

Depending on the type or degree of fouling or biolayer present on the hull, the friction may increase or decrease due to the surface of the hull becoming rougher or slicker. Accordingly, the friction standard can be used as a baseline for an increase or decrease in friction in determining whether a cleaning operation is to be performed.

Figure 6:
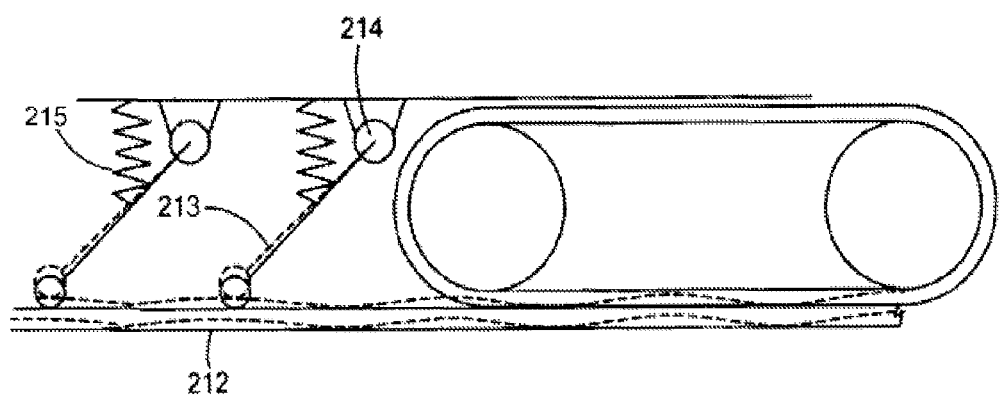
FIG. 6 is a cross-sectional side view of a hull robot with a plurality of electrodes in accordance with an embodiment of the present technology.

Referring now to FIG. 6, another example is shown in which cleanliness detection via conduction is used to determine the cleanliness of the ship's hull. More specifically, electrical conduction or resistance of the hull (or at least a portion thereof) can be measured between two or more points on the hull. Such 'points' may be established by deploying electrodes 213 from the hull robot that are caused to contact the surface of the hull (or an existing biolayer). The electrodes can be configured to be in continuous contact with the hull, or alternatively may be electrically or mechanically actuated and moving electrodes for moving into and out of position against the hull. In one example, the electrical and/or mechanical actuation can derive power from the battery and/or motor included in the robot. In the embodiment shown, electrodes 213 may be deployed using a spring 215 or other resilient member to hold the electrodes in contact with the hull and/or any biolayer present on the hull. The resilient member can be a passive mechanical device configured to deform or compress, or alternatively to expand or return to an unbiased state, based on a surface profile of the hull. The electrode can be part of or at the end of an arm coupled by a hinge 214 to the hull robot. In some examples a strain gauge or other sensor can be included in or formed integrally with the hinge 214.

In this example, if a biolayer is present, the electrical resistance and/or conduction can be compared to and different than a prior reading taken when no biolayer is present. The reading can be taken, for example, using an ohmmeter coupled to the two or more electrodes. In one example, conduction may be measured at multiple locations with multiple pairs of electrodes. The electrodes can be positioned at any desired location with respect to the robot body. For example, electrodes can be placed fairly close together away from edges of the robot body. Electrodes can be placed apart from one another at or near edges of the robot body, such as on opposite sides or ends of the robot body. The actual location of the electrodes may be generally less significant than the ability to detect electrical resistance between the electrodes.

As with the friction detection example described above, electrical conduction on a clean hull can be measured and established as a standard against which further measurements are compared. If the subsequent measurements deviate from the standard (i.e., provide a cleanliness differential), or deviate from the standard greater than a predetermined amount, then this may indicate the presence of a biolayer, and an appropriate cleaning operation can be performed.

In the examples where the electrodes are in substantially constant contact with the hull of the ship, the electrodes can be spring loaded as illustrated or otherwise have an adjustable position within the robot to maintain constant contact with the hull, while also preventing damage to the electrodes. For example, indentations, welds, and other features of a hull may cause undulations in the hull surface, which, if unaccounted for, may result in loss of contact between the electrodes and the hull or an excessive and potentially damaging force between the electrodes and the hull.

Figure 7:
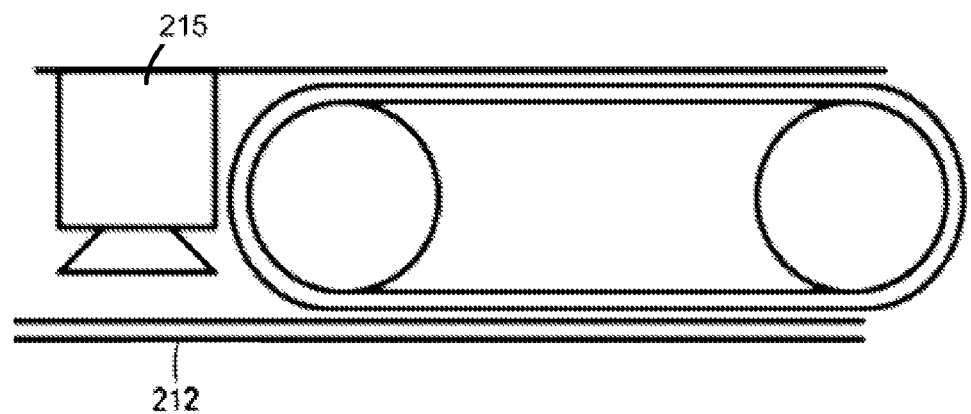
FIG. 7 is a cross-sectional side view of a hull robot with a camera in accordance with an embodiment of the present technology.

Referring to FIG. 7, in accordance with another example, cleanliness of the hull 212 is detected optically or by optical imaging, such as with a camera 215. In this example, a camera can be used to detect a color of hull. The detected color may be the color of the paint, the hull itself, or the color of a biolayer. The robot may compare a known color of the paint or hull, or a detected color of clean paint or a clean hull, with a detected color.

As with the examples described above, optical detection of a clean hull can be obtained and established as a standard against which further measurements are compared. If the subsequent measurements deviate from the standard (i.e., provide a cleanliness differential), or deviate from the standard greater than a predetermined amount, then a biolayer may be detected and a cleaning routine or operation can be performed.

The color and or intensity reflected from an intact or clean painted surface can be discrepant from the color and/or intensity reflected from a same painted surface with a biolayer thereon. Illumination wavelengths can be used to optimally increase contrast between a clean painted hull surface and a hull surface with a biolayer thereon. Also, fluorescence in the biolayer can be induced, further increasing the contrast. The optical detection methodology can include examination of incident and reflected spectra.

In further aspects of this example, the camera may be used to perform a line scan or an area scan. The camera may have a maximum contrast ratio. The camera and robot can be configured to detect and/or analyze optical spectra consistent with the maximum contrast ratio. In one example, the camera can collect and the robot can analyze various wavelengths of light along the visible and/or invisible (i.e., ultraviolet, near infrared, infrared, microwave, etc.) spectra of light, and determine an appropriate cleaning operation or routine.

Figure 8:
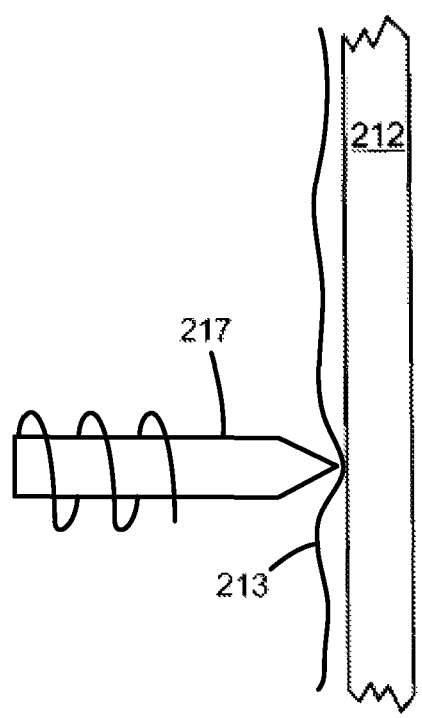
FIG. 8 is a cross-sectional side view of a hull robot with a probe in accordance with an embodiment of the present technology.

Referring now to FIG. 8, another example of cleanliness detection includes detecting a hardness of the surface of or about the hull 212 upon which the robot operates. A biolayer 213 is generally softer than paint. Thus, the presence of a biolayer can be detected by analyzing a surface hardness. It is contemplated herein that various types of hardness testing methods, or variations thereof, may be employed and implemented to be carried out by the robot, such as non-destructive scratch (Mohs scale test, etc.), indentation (e.g., Rockwell, Vickers, Shore, Brinell, etc.), and/or rebound (e.g., Leeb rebound, etc.). In one exemplary embodiment, a probe 217, spring loaded or otherwise actuated, can be supported about the robot, and positioned such that actuation of the probe or prod 217 is caused to come in contact with the surface of the hull and apply a sufficient force so as to register a force. Using detection of torque, current, or any other suitable form of detection, the robot can determine when the probe is in initial contact with the surface of the hull, even if the first layer to be contacted comprises a biolayer about the surface. If additional force is used to press the probe against the surface, the probe may further displace and penetrate a biolayer, if present, but will typically not displace further to penetrate the hull or paint on the hull with the same degree of force if the area being detected is clean. The penetration of the probe into the biolayer can be detected with various detectors, as will be readily apparent to those skilled in the art. Some example other detectors include displacement measurement devices, such as extensometers, strain gauges, optical measurement devices, variable transformer-based devices, and so forth. As has been described, cleanliness detection can be non-destructive, and cleanliness detection methods used can be performed sufficiently lightly that a paint layer present on a surface of the hull is not damaged.

A degree of penetration can be determined by measuring the distance into the surface the probe has moved.

As with the examples described above, hardness detection of a clean hull can be measured and established as a standard against which further measurements are compared. If the subsequent measurements deviate from the standard (i.e., provide a cleanliness differential), or deviate from the standard greater than a predetermined amount, then a biolayer may be detected and a cleaning operation or routine can be performed.

Figure 9:
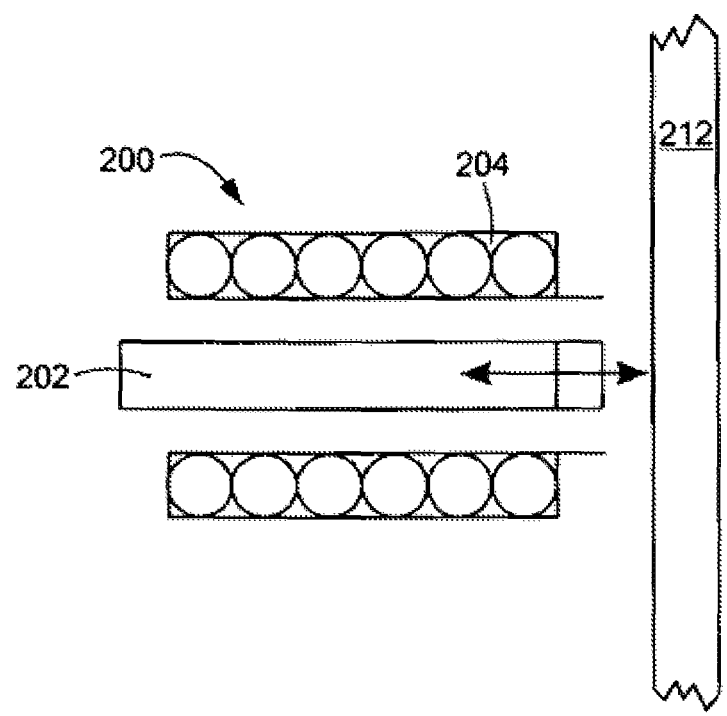
FIG. 9 is a cross-sectional side view of a tapping device in accordance with an embodiment of the present technology.

Referring to FIG. 9, another example of cleanliness detection is illustrated in which the robot includes a tapping device 200 for detecting an acoustic tap response from the ship hull 212. The tapping device may be an electrically actuated device coupled to the battery onboard the robot that can be configured to provide a tapping function (i.e., a function in which a device is caused to periodically come in contact with and retreat (e.g., rapidly retreat) from the surface of the hull, wherein a suitable force is applied so as to induce a measurable audible acoustic tap response) about the surface of the hull. In one aspect, one or more microphones 204 can be supported about the robot (e.g., supported in a position proximate the tapping device) to detect the acoustic tap response from the tapping carried out on the ship hull. In another aspect, one or more microphones may be supported and located about the ship in a position suitable for sufficiently measuring the tap response. A clean hull will typically exhibit a sharper, stronger, and clearer acoustic response than a hull having a biolayer. For instance, the biolayer can muffle or dampen or dull the acoustic tap response detected by the microphone(s), thus indicating the presence of a biolayer.

As with the examples described above, acoustic cleanliness detection of a clean hull can be measured and established as a standard against which further measurements are compared. If the subsequent measurements deviate from the standard (i.e., provide a cleanliness differential), or deviate from the standard greater than a predetermined amount, then a biolayer may be detected and a cleaning operation or routing can be performed.

For cleanliness detection based on acoustic feedback, an audio emitter can be used to emit acoustic waves towards the hull and a detector can detect the acoustic waves reflected off the surface of the hull and/or a biolayer present on the hull. As with the tapping device implementation above, reflected acoustic waves will be different when bounced off of a clean (painted) hull surface versus a hull surface with a biolayer present thereon.

As another example of cleanliness detection, chemistry at the hull surface can be detected. In one exemplary embodiment, chemistry can be detected by performing a chemical test on the surface of the hull and monitoring a result. Chemical sensing can vary from use of optical analysis to binding and detecting of selected ions. For optical analysis, a spectral analysis (i.e., spectroscopic analysis) can identify selected chemical markers that reflect indicative spectral frequencies. Alternatively, surface binding of ions or molecules for chemical components of interest can be detected using a variety of methods, including spectroscopy (due to change in reflectance) and/or change in resonant frequency (due to change in mass of the bonding element).

Chemical cleanliness detection of a clean hull can be measured and established as a standard against which further measurements are compared. If the subsequent measurements deviate from the standard (i.e., provide a cleanliness differential), or deviate from the standard greater than a predetermined amount, then a biolayer may be detected and a cleaning operation or routine can be performed.

Figure 10:
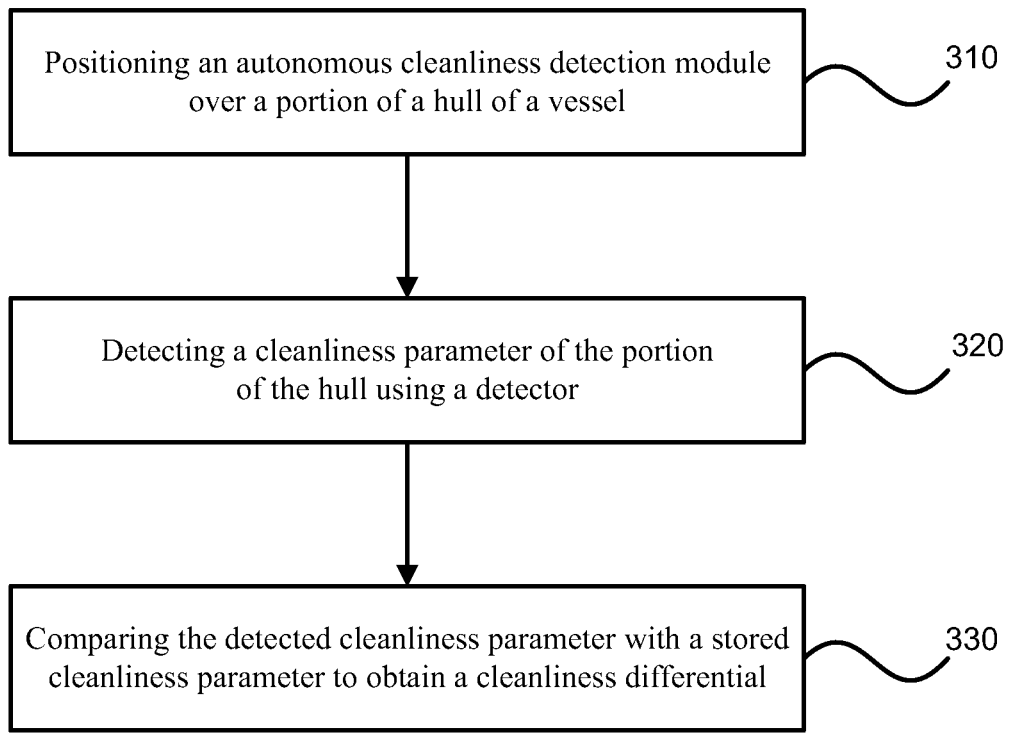
FIG. 10 is a flow diagram of a method of autonomous hull cleanliness detection in accordance with an embodiment of the present technology.

Referring now to FIG. 10, a flow diagram of a method of autonomous hull cleanliness detection is illustrated in accordance with an example. The method includes positioning 310 an autonomous cleanliness detection system over a portion of a hull of a vessel. A cleanliness parameter of the portion of the hull can be detected 320 using a detector. The detected cleanliness parameter can be compared 330 with a stored cleanliness parameter to obtain a cleanliness differential.

In further aspects, the method can further comprise determining whether the cleanliness differential is within an acceptable, pre-determined cleanliness range. The method can include analyzing the degree of the cleanliness differential to determine whether to initiate a cleaning routine or operation. The cleaning routine can be initiated when the cleanliness differential is greater than a predetermined amount. The cleaning routine can be discontinued as desired, or when the cleanliness differential is reduced to be below an acceptable threshold or to be within an acceptable range. Still further, the cleaning routine can be continued as long as desired, even if the cleanliness differential is below the threshold. In the event the area being cleaned is particularly obstinate, the cleaning routine can be ceased in the event the cleaning routine fails or is less effective, and the location recorded for later attention. Recording of the obstinate location can be done by the hull robot, with the information stored in a memory device on board the robot or at a remote location.

The cleaning routine can be a closed-loop cycle where the cleaning operation is performed until the threshold is reached by sensing the level of cleanliness of the hull even during the cleaning operation. Thus, rather than simply identifying that the cleanliness differential is above the acceptable threshold and performing the cleaning routine and moving on to a next location of the hull, the hull cleaning robot can monitor the cleanliness of a current area of the hull and continue cleaning until the cleaning objective is reached, or the cleanliness differential is reduced to an acceptable level. The degree of cleanliness can be determined continuously during cleaning, at periodic intervals during cleaning, or at the end of a cleaning operation to determine whether to continue, resume, and/or restart the cleaning routine until the hull is sufficiently clean.

The step of positioning 310 can be repeated as often as necessary to position and reposition the autonomous cleanliness detection system about the vessel hull as the robot traverses about the vessel hull, such that the step of detecting 320 can provide real-time and continuously updated cleanliness parameters along different portions of the vessel hull.

As has been described with regards to the systems above, the cleanliness parameter can comprise a friction parameter, the detected cleanliness parameter can comprise friction detected against a surface of the hull by the detector, the detector can be a cleaning element, and the stored cleanliness parameter can be a clean hull friction standard.

In another aspect, the cleanliness parameter can be an electrical resistance between two points on the portion of the hull, and the detector can be a plurality of electrodes positioned at the two points. The stored cleanliness parameter can be a clean hull electrical resistance standard.

In another aspect, the cleanliness parameter can be an optical parameter, the detector can be an optical detector, the detected cleanliness parameter can be a detected hull paint color, and the stored cleanliness parameter can be an actual or clean paint color.

In another aspect, the cleanliness parameter can be an optical parameter, the detector can be an optical detector, the detected cleanliness parameter can be a detected hull wavelength response, and the stored cleanliness parameter can be a clean hull wavelength response.

In another aspect, the cleanliness parameter can be a hardness parameter, the detected cleanliness parameter can be a hardness of the portion of the hull, and the stored cleanliness parameter can be a clean hull surface hardness.

In another aspect, the cleanliness parameter can be an acoustic parameter, the detector can be an acoustic detector, the detected cleanliness parameter can be acoustic feedback, and the stored cleanliness parameter can be acoustic feedback about a clean hull.

In another aspect, the cleanliness parameter can be a chemical parameter, the detector can be a chemical detector, the detected cleanliness parameter can be a chemistry of the hull and/or a biolayer on the hull, and the stored cleanliness parameter can be a clean paint chemistry standard.

Figure 11:
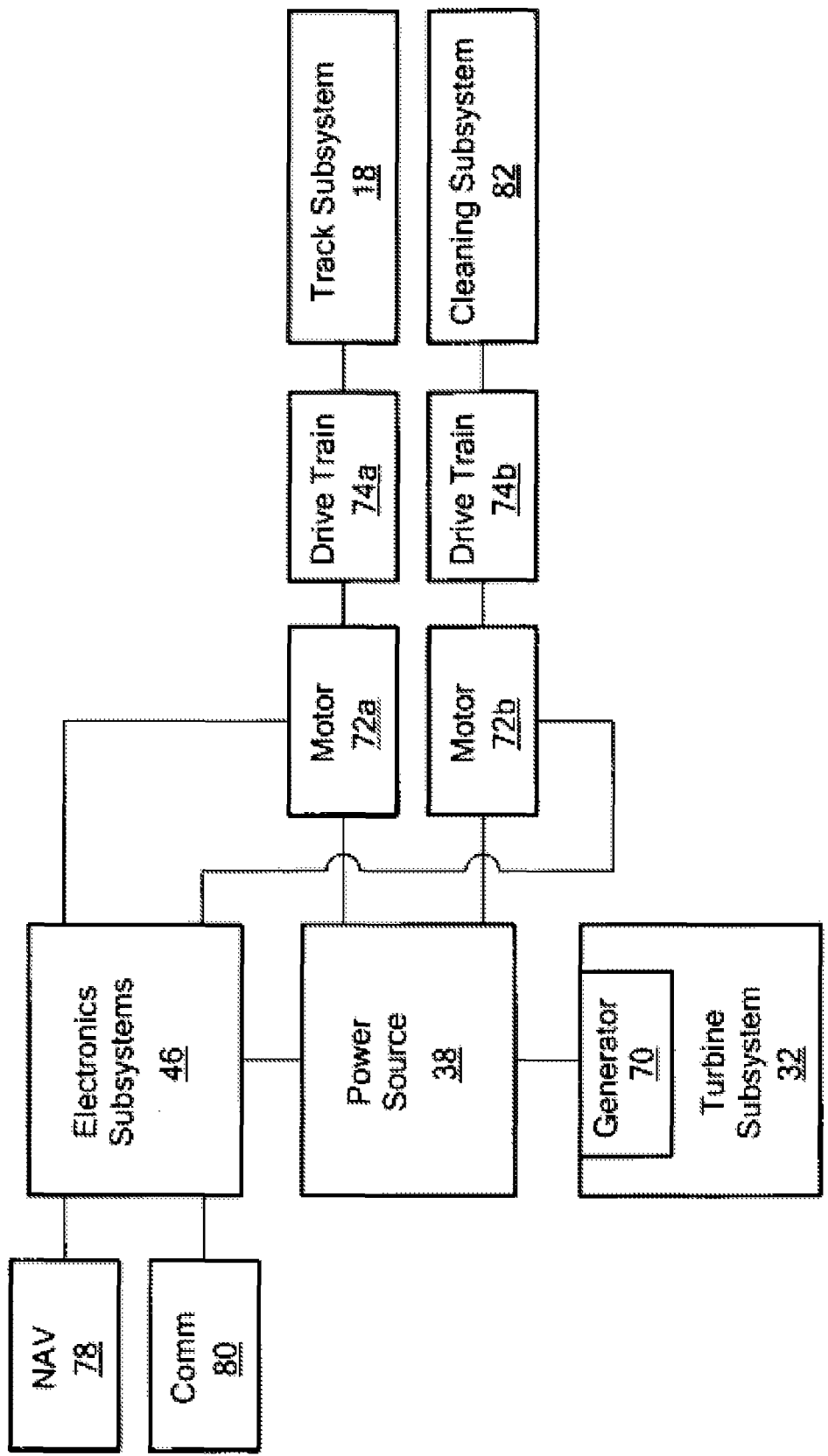
FIGS. 11-12 are system diagrams of hull cleaning robots in accordance with embodiments of the present technology.

FIG. 11, illustrates a block diagram of an example embodiment of the subject technology where turbine subsystem 32 (including one or more devices actuatable by fluid flowing past the hull) includes generator 70 which recharges power source 38. One or more motors such as motors 72a and 72b are powered by power source 38. Motor 72a drives track subsystem 18 via drive train 74a. The direction of travel of the robot can be reversed via electronic control subsystem 76 which is configured to reverse the direction of motor 72a based on inputs, for example, from navigation subsystem 78 and/or communication subsystem 80. Electronic controller 76 is also powered by power source 38. Similarly, motor 72b drives cleaning subsystem 82 (e.g., one or more brushes as described above) via drive train 74b. Motor 72b is also energized by power source 38. In other embodiments, the one or more motors may operate on the basis of a power source other than electricity. Motors are known, for example, that are fluid driven. The turbine subsystem, then, may pump fluid under pressure to the motors. If the cleaning subsystem is passive, e.g., comprising a pad and/or a squeegee, motor 72b and drive train 74b may not be included.

If the cleaning subsystem is active, e.g., driven, it may be beneficial to operate the cleaning element to assist in robot maneuvering operations. For example, in an exemplary embodiment of a hull robot comprising two rotating cleaning brushes, these could be operated in opposite directions so there is no net force on the robot from the interaction of the brushes with the hull surface. Where the hull robot includes multiple rotating brushes, the robot may include any number of brushes, but may preferably include counter-rotating brushes in multiples or sets of two so that the rotation of the brushes exerts no net lateral locomotive force on the hull robot. In another exemplary embodiment of a hull robot comprising a larger single front and/or rear brush rotatable on an axis oriented transverse to the primary direction of robot travel, such a brush could be caused to rotate opposite the direction of travel of the track when the robot is maneuvering in the direction of the water flowing past the hull (i.e., downstream) in order to help control the locomotion of the robot and counter the force effects from the passing fluid. When the robot is maneuvering upstream, it may be desirable to run the brush in the same direction as the track so as to assist the robot in moving against the fluid about the hull. When the robot is maneuvering in a direction transverse to the water flow direction, it may also be desirable to operate the brush and the track in the same direction.

Figure 12:
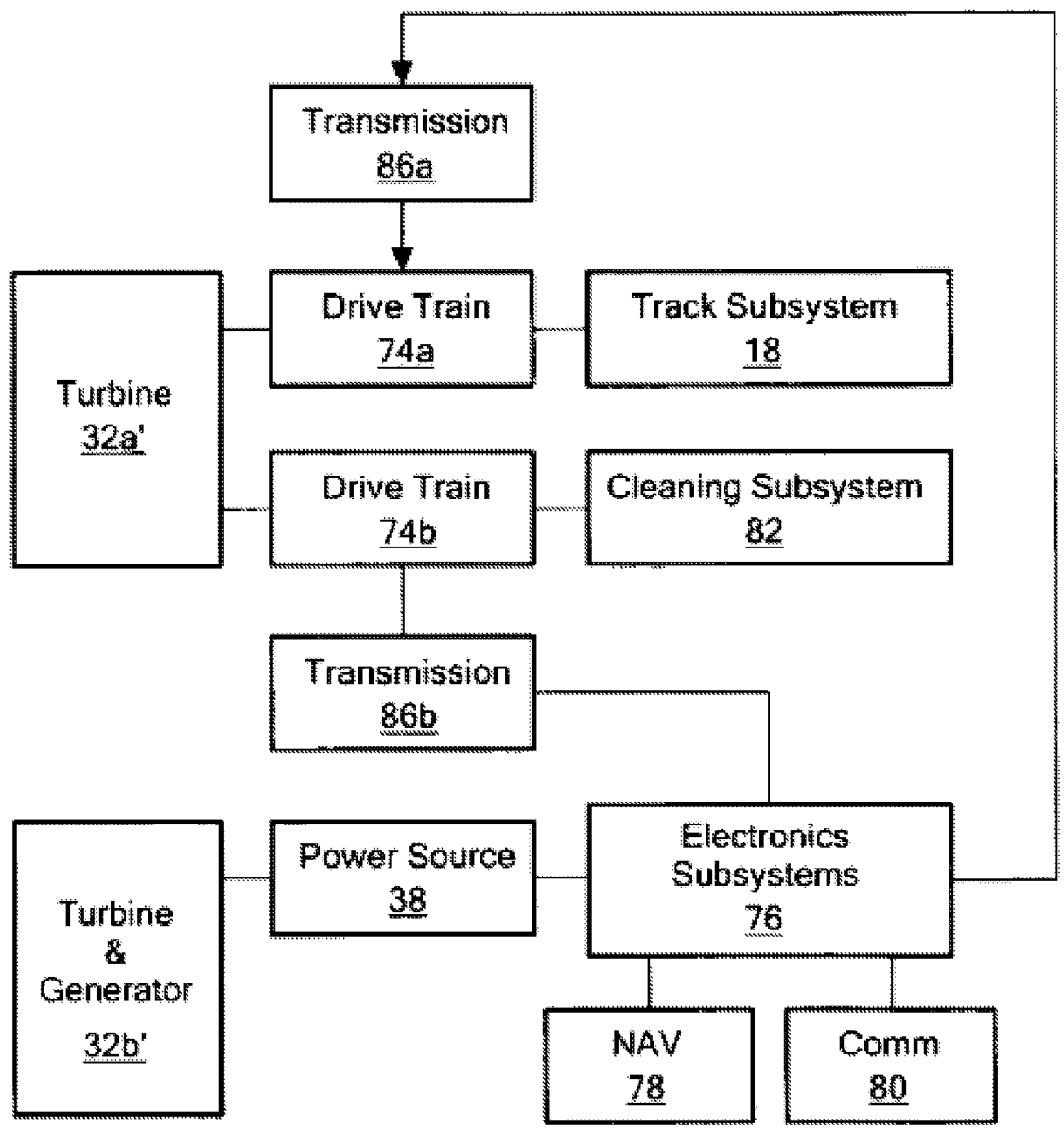

FIG. 12 illustrates a more direct drive embodiment where turbine 32a', via drive train 74a, is configured to drive the drive subsystem 18, which is shown as a track-type drive subsystem. Turbine 32a', via drive train 74b, is also configured to drive cleaning subsystem 82. Transmission 86a, under the control of electronic controller subsystem 76, may be associated with drive train 74a to control the operation, speed, and direction of the drive subsystem 18. Similarly, transmission 86b, under the control of electronic subsystem 76, may be used to adjust the operation of cleaning subsystem 82.

Typically, as described regarding FIGS. 1-2, robot 10 is oriented with the intake of turbines 32a and 32b facing the direction of the water flowing past hull 12 as shown by vector 14. Hull 12 is moving in the direction of vector 22. Under power derived from turbine 32a and/or 32b, robot 10 moves along path 24 at a fairly slow velocity, e.g., a velocity that is slower than the speed of the vessel. Near the edge of the vessel hull, robot 10 may turn slightly, stop, and then reverse direction. The direction of the motor operating the robot drive subsystem can be reversed or a transmission subsystem can be employed, as discussed above. In this way, the water flow direction is into the robot turbine intakes. Typically, the robot is controlled by software and/or circuitry 46 (FIG. 11) associated with a control module.

Referring back to FIG. 12, in general, the robot platform power plant or power source 38 includes some kind of a power scavenging system or subsystem, such as a turbine subsystem 32b', as discussed above. The turbines used could include a shaft rotated by vanes attached to the shaft or the turbine could include other structure activated by moving fluid, e.g., impellers and the like. A robot drive subsystem 18, 74a, 74b may include the at least one magnetic track disclosed above or other means for facilitating locomotion of the robot about the hull, and/or for adhering the robot to the hull. Typically, a cleaning subsystem 82 can be employed, such as the brushes discussed above. A navigation system 78 and a communication system 80 can also be provided. In some embodiments, the robot platform can include an inspection subsystem. A computerized control subsystem (i.e., electronics subsystem) 76 can be provided and configured to operate the various subsystems.

The computerized control subsystem 76 can be used in operating the cleaning subsystem(s) 82 (including the cleaning elements) and/or the drive subsystem(s) 18 (e.g., the magnetic track), or in navigating about the vessel hull using the navigation system 78. The computerized control subsystem can further be used in detecting the cleanliness of the vessel hull, storing information about a particular location on the hull (e.g., information pertaining to the cleanliness of various locations, etc.).

Figure 13:
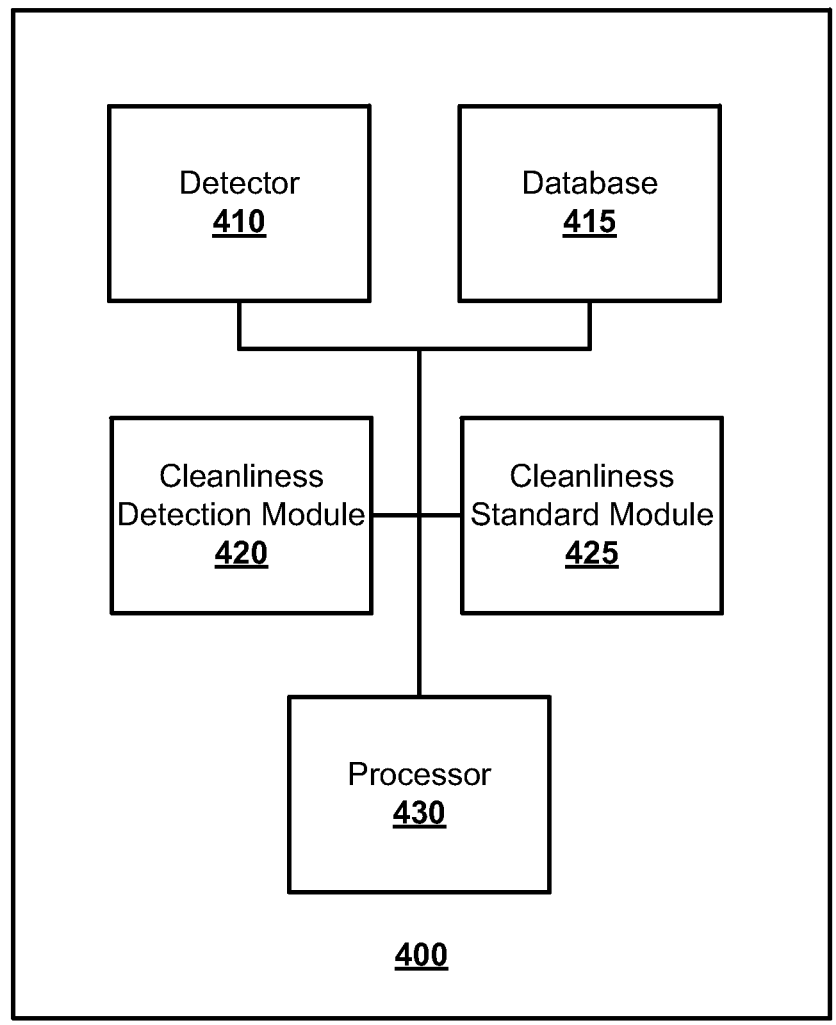
FIG. 13 is a block diagram of an autonomous hull cleanliness detection system in accordance with embodiments of the present technology.

With reference to FIG. 13, in accordance with one example, an autonomous hull cleanliness detection system 400 can include a detector or detector system 410 (which may be a non-invasive or non-destructive detector or detector system) onboard a robotic device navigable over a hull of a vessel. A database 415 onboard the robotic device can be in communication with the detector and can be configured to store hull cleanliness data obtained by the detector. The database can be stored on a non-transitory computer readable storage medium. A cleanliness standard module 425 can be in communication with the detector and the database. The cleanliness standard module can be configured to establish a standard of cleanliness by storing the hull cleanliness data obtained by the detector in the database when the hull is substantially clean. A cleanliness detection module 420 can be in communication with the detector and the database. The cleanliness detection module can be configured to store the hull cleanliness data obtained by the detector in the database when a cleanliness state of the hull is substantially unknown. A processor 430 onboard the device can be in communication with the database. The processor can be configured to compare the hull cleanliness data stored by the cleanliness standard module with the data stored by the cleanliness detection module to obtain a cleanliness differential. In other words, the cleanliness detection module can be configured to non-destructively detect the cleanliness of the hull by detecting a cleanliness parameter of a portion of the hull using a detector and comparing the detected cleanliness parameter with a stored cleanliness parameter of the portion of the hull to obtain a cleanliness differential.

A variety of detection, computing, communication, and navigation subsystems are possible in connection with a hull cleaning and/or inspection system in accordance with the subject technology.

The result, in one embodiment, is a hull robot used to inspect and clean the hull of a vessel a continuous fashion while the vessel is underway. This can provide for lower resistance about the hull (which in turn can save fuel costs), lower emissions, and reduced seawater contamination compared to prior cleaning methods, such as those discussed above.

In one aspect, a velocity threshold may exist for passing fluid to actuate the drive subsystems, cleaning subsystems, energy extraction devices and so forth. A velocity of passing fluid may be a result of the vessel to which the hull robot is attached being in motion at a velocity meeting or exceeding a pre-determined velocity or the velocity threshold.

It is noted that although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the examples discussed herein relate primarily to vessels operating in the water. The body of other structures, however, may be cleaned, inspected, or the like, using a version of the robot disclosed herein.

The methods and systems of certain examples described herein may be implemented in hardware, software, firmware, or combinations thereof. The methods disclosed herein can be implemented as software or firmware that is stored in a memory and that is executed by a suitable instruction execution system (e.g., a processor). If implemented in hardware, the methods disclosed herein can be implemented with any suitable technology that is well known in the art.

Also within the scope of this disclosure is the implementation of a program or code that can be stored in a non-transitory machine-readable medium to permit a computer or processor to perform any of the methods described above.

Some of the functional units described in this specification have been labeled as modules, in order to more particularly emphasize their implementation independence. The various modules, engines, tools, etc., discussed herein may be, for example, software, firmware, commands, data files, programs, code, instructions, or the like, and may also include suitable mechanisms. For example, a module may be implemented as a hardware circuit comprising custom VLSI (very large scale integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A method of autonomous hull cleanliness detection, comprising:
   positioning an autonomous cleanliness detection system over a portion of a hull of a vessel;
   detecting a cleanliness parameter of the portion of the hull using a detector; and
   comparing the detected cleanliness parameter with a stored cleanliness parameter to obtain a cleanliness differential, wherein the cleanliness parameter is a friction parameter, the detected cleanliness parameter is friction detected against a surface of the hull by the detector, the detector is a cleaning element, and the stored cleanliness parameter is a clean hull friction standard.

2. The method of claim 1, further comprising determining whether the cleanliness differential is within an acceptable cleanliness range.

3. The method of claim 1, further comprising analyzing the degree of the cleanliness differential to determine whether to initiate a cleaning sequence.

4. The method of claim 1, further comprising initiating a cleaning sequence when the cleanliness differential is greater than a predetermined amount.

5. The method of claim 1, further comprising an optical detector, wherein the cleanliness parameter is an optical parameter, the detected cleanliness parameter is a detected hull paint color, and the stored cleanliness parameter is an actual paint color.

6. The method of claim 1, further comprising an optical detector, wherein the cleanliness parameter is an optical parameter, the detected cleanliness parameter is a detected hull wavelength response, and the stored cleanliness parameter is a clean hull wavelength response.

7. The method of claim 1, further comprising recording cleanliness information pertaining to one or more locations about the hull of the vessel.

8. The method of claim 1, further comprising initiating a cleaning sequence, wherein a plurality of different cleaning elements are deployed.

9. A method of autonomous hull cleanliness detection, comprising:
positioning an autonomous cleanliness detection system over a portion of a hull of a vessel;
detecting a cleanliness parameter of the portion of the hull using a detector; and
comparing the detected cleanliness parameter with a stored cleanliness parameter to obtain a cleanliness differential, wherein the cleanliness parameter is an electrical resistance between two points on the portion of the hull, and the detector is a plurality of electrodes positioned at the two points.

10. A method of autonomous hull cleanliness detection, comprising:
positioning an autonomous cleanliness detection system over a portion of a hull of a vessel;
detecting a cleanliness parameter of the portion of the hull using a detector; and
comparing the detected cleanliness parameter with a stored cleanliness parameter to obtain a cleanliness differential, wherein the cleanliness parameter is a hardness parameter, the detected cleanliness parameter is a hardness of the portion of the hull, and the stored cleanliness parameter is a clean hull surface hardness.

11. A method of autonomous hull cleanliness detection, comprising:
positioning an autonomous cleanliness detection system over a portion of a hull of a vessel;
detecting a cleanliness parameter of the portion of the hull using a detector; and
comparing the detected cleanliness parameter with a stored cleanliness parameter to obtain a cleanliness differential, wherein the cleanliness parameter is an acoustic parameter, the detector is an acoustic detector, the detected cleanliness parameter is an acoustic feedback, and the stored cleanliness parameter is a clean hull acoustic feedback.

12. A method of autonomous hull cleanliness detection, comprising:
positioning an autonomous cleanliness detection system over a portion of a hull of a vessel;
detecting a cleanliness parameter of the portion of the hull using a detector; and
comparing the detected cleanliness parameter with a stored cleanliness parameter to obtain a cleanliness differential, wherein the cleanliness parameter is a chemical parameter, the detector is a chemical detector, the detected cleanliness parameter is a chemistry of the hull and/or a biolayer on the hull, and the stored cleanliness parameter is a clean paint chemistry.

13. A method of autonomous hull cleanliness detection, comprising:
positioning an autonomous cleanliness detection system over a portion of a hull of a vessel;
detecting a cleanliness parameter of the portion of the hull using a detector; and
comparing the detected cleanliness parameter with a stored cleanliness parameter to obtain a cleanliness differential, wherein the cleanliness parameter comprises a friction parameter, and wherein the detected cleanliness parameter comprises a sensor on a cleaning element operable to measure torque on the cleaning element.

14. A method of autonomous hull cleanliness detection, comprising:
positioning an autonomous cleanliness detection system over a portion of a hull of a vessel;
detecting a cleanliness parameter of the portion of the hull using a detector; and
comparing the detected cleanliness parameter with a stored cleanliness parameter to obtain a cleanliness differential, wherein the cleanliness parameter comprises an electrical current, and wherein the detected cleanliness parameter comprises a current measurement for a motor of a cleaning element.

15. A hull robot operable about a hull of a vessel, the robot comprising:
a robot body;
a drive subsystem onboard the robot for driving and maneuvering the robot about the hull; and
an autonomous cleanliness detection module configured to non-destructively detect the cleanliness of the hull by detecting a cleanliness parameter of a portion of the hull using a detector and comparing the detected cleanliness parameter with a stored cleanliness parameter of the portion of the hull to obtain a cleanliness differential, further comprising the detector, the detector comprising a cleaning element, wherein the cleanliness parameter is a friction parameter detected against a surface of the hull by the cleaning element, and the stored cleanliness parameter is a clean hull friction standard.

16. The robot of claim 15, further comprising a comparator for comparing the cleanliness differential with an acceptable cleanliness range.

17. The robot of claim 15, further comprising a cleaning subsystem configured to provide a cleaning sequence when the degree of the cleanliness differential exceeds a predetermined amount.

18. The robot of claim 15, further comprising an optical detector, wherein the cleanliness parameter is an optical parameter, the detected cleanliness parameter is a detected hull wavelength response, and the stored cleanliness parameter is a clean hull wavelength response.

19. A hull robot operable about a hull of a vessel, the robot comprising:
a robot body;
a drive subsystem onboard the robot for driving and maneuvering the robot about the hull; and
an autonomous cleanliness detection module configured to non-destructively detect the cleanliness of the hull by detecting a cleanliness parameter of a portion of the hull using a detector and comparing the detected cleanliness parameter with a stored cleanliness parameter of the portion of the hull to obtain a cleanliness differential, further comprising the detector, the detector comprising a plurality of electrodes positioned at two different points on the hull robot, wherein the cleanliness parameter is an electrical resistance of the portion of the hull between the two points when the robot is positioned adjacent the hull.

20. A hull robot operable about a of a vessel, the robot comprising:
a robot body;
a drive subsystem onboard the robot for driving and maneuvering the robot about the hull; and
an autonomous cleanliness detection module configured to non-destructively detect the cleanliness of the hull by detecting a cleanliness parameter of a portion of the hull using a detector and comparing the detected cleanliness parameter with a stored cleanliness parameter of the portion of the hull to obtain a cleanliness differential, further comprising the detector, the detector comprising a displacement measurement device and a prod, wherein the displacement measurement device detects when the prod is in contact with a surface as well as the degree of force with which the prod contacts the surface; the cleanliness parameter is a hardness parameter; the detected cleanliness parameter is a hardness of the portion of the hull as detected by a displacement of the prod against the portion of the hull; and the stored cleanliness parameter is a clean hull surface hardness.

21. A hull robot operable about a hull of a vessel, the robot comprising:
- a robot body;
- a drive subsystem onboard the robot for driving and maneuvering the robot about the hull; and
- an autonomous cleanliness detection module configured to non-destructively detect the cleanliness of the hull by detecting a cleanliness parameter of a portion of the hull using a detector and comparing the detected cleanliness parameter with a stored cleanliness parameter of the portion of the hull to obtain a cleanliness differential, further comprising the detector, the detector comprising an acoustic detector, wherein the cleanliness parameter is an acoustic parameter, the detected cleanliness parameter is an acoustic feedback, and the stored cleanliness parameter is a clean hull acoustic feedback.

22. An autonomous hull cleanliness detection system, comprising:
- a non-destructive detector onboard a device navigable over a hull of a vessel;
- a database onboard the device and in communication with the detector and configured to store hull cleanliness data obtained by the detector;
- a cleanliness standard module in communication with the detector and the database, the cleanliness standard module being configured to establish a standard of cleanliness by storing the hull cleanliness data obtained by the detector in the database when the hull is substantially clean;
- a cleanliness detection module in communication with the detector and the database, the cleanliness detection module being configured to store the hull cleanliness data obtained by the detector in the database when a cleanliness state of the hull is substantially unknown; and
- a processor onboard the device and in communication with the database, the processor being configured to compare the hull cleanliness data stored by the cleanliness standard module with the data stored by the cleanliness detection module to obtain a cleanliness differential.

* * * * *